(12) United States Patent
Kogge et al.

(10) Patent No.: US 7,584,332 B2
(45) Date of Patent: Sep. 1, 2009

(54) COMPUTER SYSTEMS WITH LIGHTWEIGHT MULTI-THREADED ARCHITECTURES

(75) Inventors: Peter M. Kogge, Granger, IN (US); Jay B. Brockman, Granger, IN (US); David Tennyson Harper, III, Seattle, WA (US); Burton Smith, Seattle, WA (US); Charles David Callahan, II, Seattle, WA (US)

(73) Assignees: University of Notre Dame du Lac, Notre Dame, IN (US); Cray, Inc., Seattle, WA (US)

( * ) Notice: Subject to any disclaimer, the term of this patent is extended or adjusted under 35 U.S.C. 154(b) by 71 days.

(21) Appl. No.: 11/675,549

(22) Filed: Feb. 15, 2007

(65) Prior Publication Data

US 2007/0198785 A1 Aug. 23, 2007

Related U.S. Application Data

(60) Provisional application No. 60/774,559, filed on Feb. 17, 2006.

(51) Int. Cl.
*G06F 12/00* (2006.01)

(52) U.S. Cl. .................. 711/147; 711/154; 711/156; 712/14

(58) Field of Classification Search ............. 711/147, 711/154, 156; 712/14
See application file for complete search history.

(56) References Cited

U.S. PATENT DOCUMENTS 7,293,270 B1 * 11/2007 Gupta et al. ............... 718/102
2007/0050580 A1 * 3/2007 Lewis ........................ 711/163

OTHER PUBLICATIONS

Zima et al., "The Cascade High Productivity Programming Language," Proceedings of the HIPS2004 Workshop, Santa Fe, New Mexico, pp. 1-37, Apr. 2004.*
David Grant, Masters Thesis, "A Lightweight Processor Core for Application Specific Acceleration," pp. i-ix and 1-27, University of Waterloo, Ontario, Canada, 2004.*
PCT International Search Report issued for PCT/US2007/062322, Jul. 11, 2008, 2 pages.

* cited by examiner

*Primary Examiner*—Stephen C Elmore
(74) *Attorney, Agent, or Firm*—Schwabe, Williamson & Wyatt

(57) ABSTRACT

Embodiments of the present invention provide a class of computer architectures generally referred to as lightweight multi-threaded architectures (LIMA). Other embodiments may be described and claimed.

66 Claims, 11 Drawing Sheets (a) Tight 1-1 relationship (b) Multiple Memory and LWPs (c) Hierarchical Arrangements

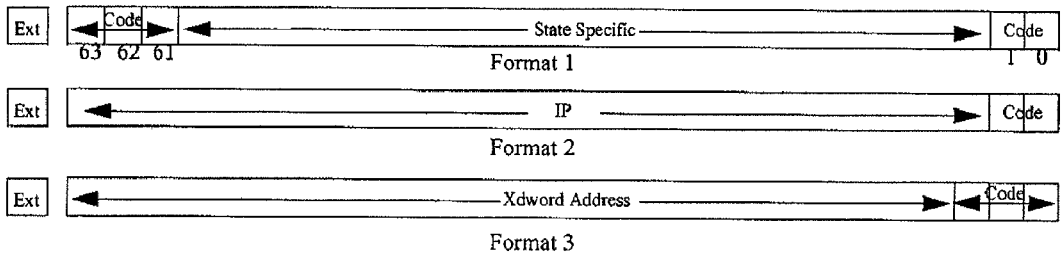

| State | Format | Description | Contents of Value Field (by bit position) | | | | | | | Relevance |
|---|---|---|---|---|---|---|---|---|---|---|
| | | | 63 | 62 | 61 | Bits 61 through 3 | 2 | 1 | 0 | |
| Special Values | | | | | | | | | | |
| U | 1 | Uninitialized | 0 | 0 | 0 | Unused | | 0 | 0 | Both |
| EC | 1 | Exception/Error Code | 0 | 1 | 0 | Unused | | 0 | 0 | Both |
| E | 1 | Empty | 0 | 0 | 1 | Unused | | 0 | 0 | Both |
| Special Access | | | | | | | | | | |
| L | 1 | Locked | 1 | 1 | 1 | Optional info on locking processor, locking request, or copies of the original memory location | | 0 | 0 | Mem |
| TOA | 2 | Trap on Access | | | | Information for Trap Procedure | | 1 | 1 | Mem |
| FP | 3 | Forward Value | | | | Xdword Address | 1 | 1 | 0 | Mem |
| FVF | 3 | Forward Value and Leave Full | | | | Xdword Address | 0 | 0 | 1 | Mem |
| FVE | 3 | Forward Value and Leave Empty | | | | Xdword Address | 1 | 0 | 1 | Mem |
| FVL | 3 | Forward Value and Leave Locked | | | | Xdword Address | 0 | 1 | 0 | Mem |
| Integration with Threads | | | | | | | | | | |
| PR | 1 | Pending Reply | 1 | 0 | 0 | IP of Requesting Instruction or (partial) virtual address of location being accessed | | 0 | 0 | Reg |
| BPR | 1 | Blocked Pending Reply | 1 | 0 | 1 | as with PR | | 0 | 0 | Reg |
| BPD | 1 | Blocked Pending Data | 1 | 1 | 0 | Optional value source | | 0 | 0 | Reg |

FIG. 11

| Command | Arguments | Originator | Function | Reply? |
|---|---|---|---|---|
| | | | Reads from Memory | |
| read | A, R, S, F, E | LWP instr | Obtain copy of value field of designated memory and return to requestor via reply. Target must be in full state. | yes |
| read&empty | A, R, S, F, E | LWP instr | As with read, but leave memory xdword in empty statte | yes |
| read&lock | A, R, S, F | LWP instr | As with read, but leave xdword in locked state, and return a copy of those parts of the target that are modified by the locking process. | yes |
| readx | A, R, S, F | LWP instr | As with read, but ignore the state of the target location and return unmodified copy of value field, as is. Corresponds to a classical memory read. | yes |
| | | | Writes to Memory | |
| write | A, R, D, F, M, E | LWP instr | Place data into target's value field, and set state to Full. Return result of operation as a reply to requestor. | yes |
| write_on_empty | A, R, D, F, M | LWP instr | As with write, but target must be in empty state first. | yes |
| writex | A, R, D, X | LWP instr | Ignore current state and overwrite entire xdword. Corresponds to a classical write. | yes |
| reply | R, D, X | Memory | Treat target as a thread register and write full xdword. | no |
| | | | Others | |
| write reply | A, R, X, D | LWP Instr | Generate what looks like a reply to location A which should be a register awaiting a value, but generate a normal reply to sender | yes |
| amo | A, R, S, F, D, M, O | LWP instr | Read and return value field as in read. Also using provided data, combine with value field and replace in target. | yes |
| amox | A, R, S, F, D, X, M, O | LWP Instr | As with amo, but ignore state of target location, and return both value and extension field. | yes |

Arguments:
A: address of memory location against which operation should be performed.
R: address of memory location to receive reply from operation (usually a register)
D: data to be written to target value field
X: extension bit to be written into target extension bit.
S: size of operand
F: forwarding flag that indicates whether or not this request can be forwarded on an xdword in an FP state.
M: mask to use for subword writes.
O: operation to be used in amo read-compute-write sequence.
E: EMS fork enable - when enabled and an error code is appropriate, a local thread is to be created to handlle it.

FIG. 12

| Current State | Next State of Target Memory Location | | | | | | | | | | |
|---|---|---|---|---|---|---|---|---|---|---|---|
| | read | read & empty | read & lock | readx | write | write on empty | writex | reply | write reply | am-o | amox |
| F | UNC | E:S | L:S | UNC | F:D | UNC | X:D | UNC | UNC | F:C | X:C |
| U | UNC | UNC | L:S | UNC | F:D | UNC | X:D | UNC | UNC | F:C | X:C |
| EC | UNC | UNC | L:S | UNC | F:D | UNC | X:D | UNC | UNC | F:C | X:C |
| E | FVF:R | FVE:R | L:S | UNC | F:D | F:D | X:D | UNC | UNC | F:C | X:C |
| L | UNC | UNC | UNC | UNC | UNC | UNC | X:D | UNC | UNC | UNC | UNC |
| TOA | UNC | UNC | L:S | UNC | UNC | UNC | X:D | UNC | UNC | UNC | X:C |
| FP | UNC | UNC | L:S | UNC | UNC | UNC | X:D | UNC | UNC | UNC | X:C |
| FVF | UNC | UNC | L:S | UNC | F:D | F:D | X:D | UNC | UNC | UNC | X:C |
| FVE | UNC | UNC | L:S | UNC | E:S | E:S | X:D | UNC | UNC | UNC | X:C |
| FVL | UNC | UNC | L:S | UNC | L:S | L:S | X:D | UNC | UNC | UNC | X:C |
| PR | UNC | UNC | L:S | UNC | UNC | UNC | X:D | X:D | X:D | UNC | X:C |
| BPR | UNC | UNC | L:S | UNC | UNC | UNC | X:D | X:D | X:D | UNC | X:C |
| BPD | UNC | UNC | L:S | UNC | F:D | F:D | X:D | UNC | UNC | F:C | X:C |

Note: Above next state representation listed in "S:V" format, where "S" is state of the xdword and "V" is the bits placed in what is left of the value field. Options include:
UNC: unchanged from the original contents (both extension and value)
O: the original bits in the location
D: data bits from the memory request
C: value bits computed by a combination of the original bits and the bits from the memory request.
S: bits defined by the format of the specified state, as described in Figure 11.
R: return address from the request
X: extension bit from the memory request.

FIG. 13

| Current State | Contents of Reply to Requester | | | | | | | | | | |
|---|---|---|---|---|---|---|---|---|---|---|---|
| | read | read & empty | read & lock | readx | write | write on empty | writex | reply | write reply | amo | amox |
| F | COPY | COPY | COPY* | COPY | OK | *EC:# | OK | none | EC:# | COPY | COPY |
| U | *EC:# | *EC:# | COPY* | COPY | OK | *EC:# | OK | none | EC:# | COPY | COPY |
| EC | *EC:# | *EC:# | COPY* | COPY | OK | *EC:# | OK | none | EC:# | COPY | COPY |
| E | none | none | COPY* | COPY | OK | OK | OK | none | EC:# | COPY | COPY |
| L | *EC:# | *EC:# | EC:# | COPY | *EC:# | *EC:# | OK | none | EC:# | EC:## | COPY |
| TOA | none | none | COPY* | COPY | none | none | OK | none | none | none | COPY |
| FP | none | none | none | COPY | none | none | OK | none | none | EC:## | COPY |
| FVF | *EC:# | EC:# | COPY* | COPY | OK | OK | OK | none | EC:# | EC:## | COPY |
| FVE | *EC:# | EC:# | COPY* | COPY | OK | OK | OK | none | EC:# | EC:## | COPY |
| FVL | *EC:# | EC:# | COPY* | COPY | OK | OK | OK | none | EC:# | EC:## | COPY |
| PR | *EC:# | *EC:# | COPY* | COPY | *EC:# | *EC:# | OK | none | OK | EC:## | COPY |
| BPR | *EC:# | *EC:# | COPY* | COPY | *EC:# | *EC:# | OK | none | OK | EC:## | COPY |
| BPD | *EC:# | *EC:# | COPY* | COPY | OK | OK | OK | none | EC:# | COPY | COPY |

Note: Above next state representation listed in "S:V" format, where "S" is state of the xdword and "V" is the bits placed in what is left of the value field. Options include:
COPY: exact copy of all bits from location
COPY*: copy of the target location, but with at least one of the bits replaced by a copy of the extension bit.
*EC: if the EMS enable option is set, don't return the reply but start a local trap thread.
: an appropriate code designating the particular error condition detected
OK: an "OK" status value, nominally a F:zero

FIG. 14

| Current State | Additional Operations Performed | | | | | | | | | | |
|---|---|---|---|---|---|---|---|---|---|---|---|
| | read | read & empty | read & lock | readx | write | write on empty | writex | reply | write reply | amo | amox |
| F | none | none | none | none | none | *EMS | none | Raise | none | none | none |
| U | *EMS | *EMS | none | none | none | *EMS | none | Raise | none | none | none |
| EC | *EMS | *EMS | none | none | none | *EMS | none | Raise | none | none | none |
| E | none | none | none | none | none | none | none | Raise | none | none | none |
| L | *EMS | *EMS | none | none | *EMS | *EMS | none | Raise | none | none | none |
| TOA | EMS | EMS | none | none | EMS | EMS | none | Raise | Raise | none | none |
| FP | Fwd | Fwd | Fwd | none | Fwd | Fwd | none | Raise | Fwd | none | none |
| FVF | *EMS | none | none | none | Reply | Reply | none | Raise | none | none | none |
| FVE | *EMS | none | none | none | Reply | Reply | none | Raise | none | none | none |
| FVL | *EMS | none | none | none | Reply | Reply | none | Raise | none | none | none |
| PR | *EMS | *EMS | none | none | *EMS | *EMS | none | none | none | none | none |
| BPR | *EMS | *EMS | none | none | *EMS | *EMS | none | Resume | Resume | none | none |
| BPD | *EMS | *EMS | none | none | none | none | none | Raise | none | none | none |

Note: Options include:
Raise: raise an exception in the frame which owns the target location.
Reply: generate a reply command to forward the data from the request to the address left in the target.
Fwd: forward the request unmodified to the designated location.
Resume: mark the frame which owns the target location as now an active thread
EMS: create a new thread locally, with arguments including address of target and arguments from request.
*EMS: create a new trap thread only if EMS enable option is set in the request.

FIG. 15

| Current State | Use as Source Register Alone | | Use as ALU Target Register Alone | | Use as Both Source and ALU Target | | Use as Target of a Memory Instruction | | Use as Both Source and Memory Target | |
|---|---|---|---|---|---|---|---|---|---|---|
| | New Register State | Next Thread State | New Register State | Next Thread State | New Register State | Next Thread State | New Register State | Next Thread State | New Register State | Next Thread State |
| F | F | Continue | F | Continue | F | Continue | PR | Continue | PR | Continue |
| U | U | Raise | F | Continue | F | Raise | PR | Continue | PR | Raise |
| EC | EC | Raise | F | Continue | F | Raise | PR | Continue | PR | Raise |
| E | BPD | Suspend | BPD | Suspend | BPD | Suspend | BPD | Suspend | BPD | Suspend |
| L | L | Retry | L | Retry | L | Retry | L | Retry | L | Retry |
| TOA | TOA | Raise | TOA | Raise | TOA | Raise | TOA | Raise | TOA | Raise |
| FP | FP | Raise | FP | Raise | FP | Raise | FP | Raise | FP | Raise |
| FVF | FVF | Raise | FVF | Raise | FVF | Raise | FVF | Raise | FVF | Raise |
| FVE | FVE | Raise | FVE | Raise | FVE | Raise | FVE | Raise | FVE | Raise |
| FVL | FVL | Raise | FVL | Raise | FVL | Raise | FVL | Raise | FVL | Raise |
| PR | BPR | Suspend | BPR | Suspend | BPR | Suspend | BPR | Suspend | BPR | Suspend |
| BPR | BPR | Raise | BPR | Raise | BPR | Raise | BPR | Raise | BPR | Raise |
| BPD | BPD | Raise | BPD | Raise | BPD | Raise | BPD | Raise | BPD | Raise |

Notes:
Continue: Execution for this thread continues normally
Suspend: This thread leaves the active list, in a state to repeat this instruction when restarted.
Raise: raise an exception in this thread but continue execution
Retry: allow this instruction to be retried

FIG. 16

| 6 3 | | | | | | | | | | | 5 2 | 5 1 | 5 0 | 4 9 | 4 8 | 4 7 | 4 6 | 4 5 | 4 4 | 4 3 | 4 2 | 4 1 | 4 0 | 3 9 | 3 8 | 3 7 | | | | | | | | | | | | | | | | | | | | | 8 | 7 | 6 | 5 | 4 | 3 | 2 | 1 | 0 |
|---|---|---|---|---|---|---|---|---|---|---|---|---|---|---|---|---|---|---|---|---|---|---|---|---|---|---|---|---|---|---|---|---|---|---|---|---|---|---|---|---|---|---|---|---|---|---|---|---|---|---|---|---|---|
| Exceptions | | | | | | | | | | | un used | E M S | P R I O | P R I V | | D | P | A | B | S | T | | Link Pointer | | | | | | | | | | | | | | | | | | | | | F R M | | | C V 1 | | | C V 2 | | |
| Exception Mask | | | | | | | | | | | un used | I | M A R K | | | Instruction Pointer | | | | | | | | | | | | | | | | | | | | | | | | | | | | | | | C S E L | | |

TSW 1
- Exceptions: sticky bits to record exception conditions as they occur
- EMS: enable extended memory semantics on load/stores
- PRIO: thread priority
- PRIV: thread privilege level
- D: Thread protection domain
- P: Protection value
- A: thread is active/free
- B: Thread is blocked
- S: thread is suspended
- T: Thread is to raise exception when it blocks
- Link pointer: physical memory address of next thread in list (when so linked)
- FRM: floating point rounding mode
- CV1: condition code #1
- CV0: condition code #2

TSW 0:
- Exception Mask: bits to mask off which exception are significant
- I: when set, indicates non-maskable interrupt to be taken
- MARK: application specific thread description
- IP: virtual address for next instruction
- CSEL: selects which set of performance counters to use

FIG. 17

COMPUTER SYSTEMS WITH LIGHTWEIGHT MULTI-THREADED ARCHITECTURES

CROSS REFERENCE TO RELATED APPLICATIONS

The present application claims priority to U.S. Patent Application No. 60/774,559, filed Feb. 17, 2006, entitled "Computer Architectures with Increased Concurrency Capabilities," the entire disclosure of which is hereby incorporated by reference in its entirety.

GOVERNMENT INTERESTS

This invention was made with Government support under a subcontract to Subcontract No. NBCH3039003 awarded by DOI/NBC. The Government has certain rights in the invention.

TECHNICAL FIELD

Embodiments of the present invention relate to the field of computer architecture, and more particularly, to a lightweight multi-threaded architecture.

BACKGROUND

Over the last few decades the peak rate at which microprocessors are able to execute instructions has increased dramatically, thus increasing performance and decreasing the time required to perform useful applications. This increase has been due in large part to two separate trends: an increase in the basic rate at which basic steps may be carried out (termed clock rate and measured in units of gigahertz or GHz), and an increase in the average number of instructions that may be started from a single program in any one of these clock cycles (termed Instruction Level Parallelism or ILP, and measured in units of Cycles per Instruction or CPI, or its numeric reciprocal Instructions per Cycle or IPC). In most cases one cycle corresponds to one clock period (thus, N GHz corresponds to N billion cycles per second). Both of these factors have been affected by improvements in the semiconductor technology used to create logic, specifically, the individual transistors are getting faster and smaller.

Unfortunately, in many real systems the actual delivered performance has not been growing at the same rate, primarily because these same improvements in semiconductor technology, when applied to the memory side of computers, has been used to increase the number of bits per unit area of silicon chip, and not the speed of access. Thus, there has been much discussion of the emergence of the "memory wall." Relatively speaking, it is taking more and more CPU cycles for an instruction to reach across from where it is interpreted in the chip containing the logic of the Central Processing Unit (or CPU) to the chips containing the memory. In general, the round trip time of such an access is referred to as the memory latency and it is measured in clock cycles. Today, with CPU clocks in the 4+ GHz range, and memory up to 200 nanoseconds away, such latency may approach a thousand cycles. It is expected that this wall will only increase with future technology improvements.

A variety of techniques have been employed to increase total performance by increasing the number of activities being performed on behalf of a program by the CPU. A first example is deep pipelining, where the basic CPU logic is broken into a series of smaller circuits that can all be run concurrently on different instructions that enter the pipeline one at a time in program order. A second example is super-scalar execution, where multiple different instructions are attempted to be started at the same time. Variations of this latter technique include in-order execution (where only instructions that are known to follow each other as seen by a programmer may be launched simultaneously), out-of-order execution (where some subset of "ready to run" instructions are chosen arbitrarily from a pool of potential instructions), and speculative execution (where instructions are started even when it is not clear that the program will want them executed).

In all of these cases, significant logic is expended to ensure that the results computed by executing all these instructions concurrently is the same as if the instructions had been executed "one at a time," from start to finish, in program order (the order the programmer had in mind when the program code was written). Techniques such as bypassing, forwarding, or short-circuiting are used to move copies of data computed by some first instruction directly to the logic trying to execute some second instruction that needs such results, without waiting for the first instruction to complete and deposit its result in the target register specified by the instruction, and from which the second instruction should logically retrieve it.

The above techniques become quite difficult when the result to be provided by some first instruction must come from memory. The completion of this first instruction must now be suspended for potentially very long periods of time, as must the operation of a second instruction, and thus, any instructions that are dependent on it. When there are many such memory reference instructions (as there are in most real programs), the CPU logic quickly runs out of logic to keep track of all the suspended instructions, and thus, becomes incapable of starting additional instructions. The CPU grinds to a halt while the memory references are processed.

To reduce the memory latency, and thus, reduce the time in which CPUs are running at less than peak rate due to memory operations, caches have been introduced to keep copies of different parts of memory in storage closer to the CPU (usually on the same chip as the CPU). Many machines today have two or even three levels of caches of different sizes and speeds to help with the illusion of memory being closer to the CPU. However, given the lengths of latencies when the required data is not in cache, even an occasional reference that misses the cache can severely impact performance.

Complicating such situations is the need to keep some order to the sequence in which memory is accessed, particularly when instructions that are to change memory (stores) are interleaved with those that simply wish to read memory (loads). Most computer designs define some memory consistency model that specifies the order in which memory operations are to be performed in relation to the program order of the instruction execution. This requires additional logic, and additional, largely invisible to the programmer, information to keep track of which memory instructions are pending, what are the addresses of the memory locations they are accessing, and what was the order of these instructions in relation to program order. This logic must know how to determine when certain memory requests must be delayed until the completion of others, and when it is safe to allow operations to proceed. Such functionality is often found in load queues, store buffers, etc.

The temporary storage needed to hold temporary copies or keep track of these instruction dependencies is generally referred to as part of the programmer invisible machine state. This is in contrast to the programmer visible machine state, which consists of all the registers and program control information that persists from instruction to instruction and is visible to, or under the explicit control of, the programmer. Examples of the latter include the register file, the program counter, status registers, etc. In virtually all modern computer architectures, the invisible state significantly exceeds the visible state in size (number of bits of information).

Classical parallel processing tries to beat this memory wall in an orthogonal way by building systems with multiple CPUs and multiple memories, and writing programs that are explicitly broken into smaller subprograms that may be run independently and concurrently, usually on different CPUs. When each of these subprograms controls its own memory, CPU, and other resources, it is often referred to as a process, and the technique of running different communicating processes on different processors is called multi-processing.

Multi-processing generally has two major variants. In Shared Memory systems, even though no particular memory unit may be physically near some specific CPU, any program running on any processor may perform loads and stores to any memory anywhere in the system (obviously some references may take longer than others). In Distributed Memory systems, each CPU has its own memory (with the combination called a node), and memory references from a CPU are allowed only to that CPU's memory. To communicate with a different node, a program must explicitly manage some sort of communication via a message that is handled by some sort of node-to-node communication mechanism.

In many cases all the memory for a Shared Memory Multiprocessor (SMP) is physically on the same memory bus with all the CPUs. However, it is possible to build machines where the memory is physically distributed to the different CPUs, but logically accessible to all CPUs via interconnection networks that tie all such nodes together. Such systems are generally referred to as Distributed Shared Memory (DSM) systems.

When each subprogram owns only its own set of registers, and the memory and other resources are owned and managed at a higher level, it is generally referred to as a thread, and the technique of running multiple threads at the same time is called multi-threading. Modern parallel programming languages such as UPC make such threads visible to the programmer and allow the programmer explicit control over the allocation of different threads to different parts of the program's execution.

Multi-threading has been implemented in a variety of ways. Most simply, a single CPU is able to run a single thread uninterrupted for a while, and then stop, save the thread's visible state, especially registers, to memory, load the register values for some other thread into the CPU registers, and run that thread for a while. Doing so, however, requires that before a thread's registers are saved to memory, all activity associated with that thread must come to some sort of completion, where nothing in the CPU's invisible state is needed to restart the thread at a later point.

Keeping multiple sets of registers in the CPU, and simply selecting which one of them will control the CPU logic, may greatly reduce the cost of a thread switch. However, when one thread is running, any delays due to memory or dependencies will result in delaying not only the current thread, but also the time at which a different thread may be given control and allowed to execute.

With multiple sets of register files within the CPU, additional strategies may be used to reduce dead time in the CPU. For example, when one thread reaches a situation where no forward progress may be made for a while (such as all instructions from one thread are blocked waiting for a long memory reference to resolve itself), new instructions may be issued in support for some other thread.

Such techniques may greatly increase the amount of internal invisible machine state within the CPU, and usually requires adding tags to each such item to identify to which thread (signified by which physical register file) the state information belongs.

Simultaneous multi-threading (SMT) may take this process one step further by allowing instructions from not one, but multiple threads to be simultaneously in execution within a single CPU's logic. How and when different instructions from different threads are issued into the logic may be as simple as issuing a few instructions (often only one) from one thread and then switching to issuing instructions from another thread, before the first instructions have completed. It may be as complex as enhanced superscalar designs, where one or more instructions from different threads are started at exactly the same time.

In many of these designs, once a thread has had an instruction issued into a CPU on its behalf, no more instructions are allowed to be issued for that thread until the first one completes. With a sufficient number of threads available to the CPU, this means that the often significant costs associated with inter-instruction dependency checking, tracking, and associated invisible state need not be implemented. This results in a much cleaner and simpler design, and one that may often actually drive the hardware to higher levels of utilization.

One limitation of current multi-threaded architectures that explicitly allow multi-threaded programming is that there are usually some fixed maximum number of threads that the hardware may support, that each of these threads is bound to some specific node, and the threads that are actually in use by the program are also fixed, and managed explicitly by the program. In a real sense, each "physical" thread has a unique name (that which identifies the set of registers it owns) that is part of the programming model. Thus, reallocating the physical resources associated with a thread is an explicit high-level software function. This includes redirecting a particular hardware thread resource set to perform some other portion of an application.

Once multiple threads are available to support an application, a very common next requirement is that different threads that support the same application may very well need to exchange data between themselves and otherwise synchronize their behavior during the execution of the overall program.

Synchronizing their behavior may take several forms. Shared memory locations may be used as locks, semaphores, or monitors to restrict concurrent access to some critical section of code to some limited number of threads (usually just a single thread) at a time. Threads that find the critical section occupied must wait until one or more of the threads currently within the critical section exit. Barriers are a variant of this where no thread is allowed to pass a certain point in a program until some defined subset of other currently active threads (usually all of them) have also reached the same point.

Finally, there is very often a defined ordering to the threads and what data they process. Under producer-consumer programs, some thread is responsible for computing, or "producing," all elements of some stream of data items, and some other thread is responsible for performing some further computation on these items, i.e. "consuming" them. Of course there may be a chain of such threads, with one thread being both the consumer of one stream of data and the producer of another. What is key here is the exchange of data items from the producer to the consumer, since one usually wishes to ensure that no consumer starts processing until it is assured that the data being processed comes from the producer in its final form, and that all producers want to be assured that all data items generated by them will in fact be delivered to a consumer, and usually in the order of production. Producer-consumer semantics is the name usually given to the mechanisms employed by the program to guarantee these constraints.

In terms of languages, UPC has properties that begin to dovetail nicely with such architectures, albeit without explicit producer/consumer functionality. UPC explicitly supports multiple threads within at least a partially shared memory model. Each thread has an "affinity" to a particular region of shared memory, as determined by address, but can freely access other regions of shared memory. Objects may be mapped into this shared memory space so that it is known which objects are in affinity with which threads. In addition, each thread has access to a private, local, memory space that is inaccessible to the other threads.

The programming language Java has some different but again relevant properties. It has explicit support for both the concept of threading, for relatively unlimited multi-threading, and for both a shared and a private working memory. However, being an object-oriented language, it hides the underlying machine's address space from the programmer. Instead, Java allows virtually any object class to have a thread definition attached to it. Thus, when an instance of such an object is created, the attached run method can be invoked, starting a thread that has access to the object's components. This thread runs until it decides to terminate itself, although there is a mechanism for other threads to post an "interrupt" to the object that the thread can explicitly test. Likewise, through appropriate method calls, external threads can gain access to the object's components, and thus interact with the object's resident thread. Finally, there are methods that allow one thread to wait for termination of another thread, and for a thread to select its priority for execution.

While Java doesn't support explicit consumer/producer semantics, it does support synchronized methods, whereby once a method of such a type has been invoked against a certain object, that object is "locked out" from being accessed with a synchronized method by another thread until the first method completes. The Java Virtual Machine assumes one such lock/monitor for each object, along with instructions to acquire and release them.

Modern semiconductor technology now allows multiple CPUs, each called here a core, to be placed on the same semiconductor die, and share with each other caches and other memory structure. Such chips are called multi-core chips. A chip referred to as EXECUBE was arguably the first such design to do this with 8 independent and complete CPU cores on the same die, along with memory. Virtually all modern microprocessor vendors now offer such multi-core chips, albeit with on-chip caches rather than on-chip memory. There is no constraint as to what kind of CPU each core implements: pipelined, superscalar, or multi-threaded.

A separate semiconductor fabrication technique termed Processing-In-Memory (PIM), Merged Memory and Logic Devices (MLD), or Intelligent RAM (IRAM), now allows such cores to be placed on not a logic chip but a high density memory die, greatly reducing the latency when memory references made by the CPU are to the on-chip memory. Again, the EXECUBE chip was arguably the first to have done so with a DRAM memory technology.

This technique has not yet achieved widespread use because the amount of memory typically desired per microprocessor CPU today is much more than may be placed on a single silicon die. In addition, when the base semiconductor technology is high density DRAM, the transistors used for on-chip logic are often noticeably slower than those on a die made for high speed logic.

Thus, much of what is being done classically, both at the Instruction Set Architecture (ISA—description of the instructions and program-visible data structures from which programs may be constructed and what they perform when executed) and microarchitectural levels (what are the major building blocks of a computer and how they implement the ISA) is increasing the amount of state information that needs to be maintained at the site of execution of a program thread. This increasing state is having a chain reaction effect on computer designs: more state is added to help reduce the apparent gap to memory, and ends up burying, deeper and deeper into a chip and further and further from memory, the core logic that actually does something useful, which in turn requires more state to overcome the effects of increasing distance. Virtually all of the predictive and caching schemes developed over the past few decades have had such an effect.

The raw latencies get even worse when one considers highly parallel systems where memory may literally be on the other side of the machine room.

Furthermore, these memory wall problems are due largely to a lack of re-examination of the underlying execution model: they are due to the assumption that there are at best a very limited number of function unit blocks of logic that perform the basic processing, that these function units need to be separated from memory, and that the purpose of the surrounding core logic is to transfer data to and from such logic in the overall utilization of these function units.

This does not conform to the current state of technology. The average personal computer today has several thousand square millimeters of silicon, most of which is cheap memory, and where at best a very few square millimeters of logic (the function units) buried in the single most expensive chip (in cost, power, area, complexity, etc.) are what modern designs are trying so heroically to be used efficiently.

BRIEF DESCRIPTION OF THE DRAWINGS

Embodiments of the present invention will be readily understood by the following detailed description in conjunction with the accompanying drawings. To facilitate this description, like reference numerals designate like structural elements. Embodiments of the invention are illustrated by way of example and not by way of limitation in the figures of the accompanying drawings.

FIG. 11 schematically illustrates extended memory state encodings, in accordance with various embodiments of the present invention;

FIG. 12 schematically illustrates memory operations, in accordance with various embodiments of the present invention;

FIG. 13 schematically illustrates changes of memory state as a function of operation performed, in accordance with various embodiments of the present invention;

FIG. 14 schematically illustrates value returned by memory operations as a reply to an original requestor, in accordance with various embodiments of the present invention;

FIG. 15 schematically illustrates additional operations performed at target memory location, in accordance with various embodiments of the present invention;

FIG. 16 schematically illustrates state changes for register during instruction execution, in accordance with various embodiments of the present invention; and FIG. 17 schematically illustrates a thread status word, in accordance with various embodiments of the present invention.

DETAILED DESCRIPTION OF EMBODIMENTS OF THE INVENTION

Figure 1:
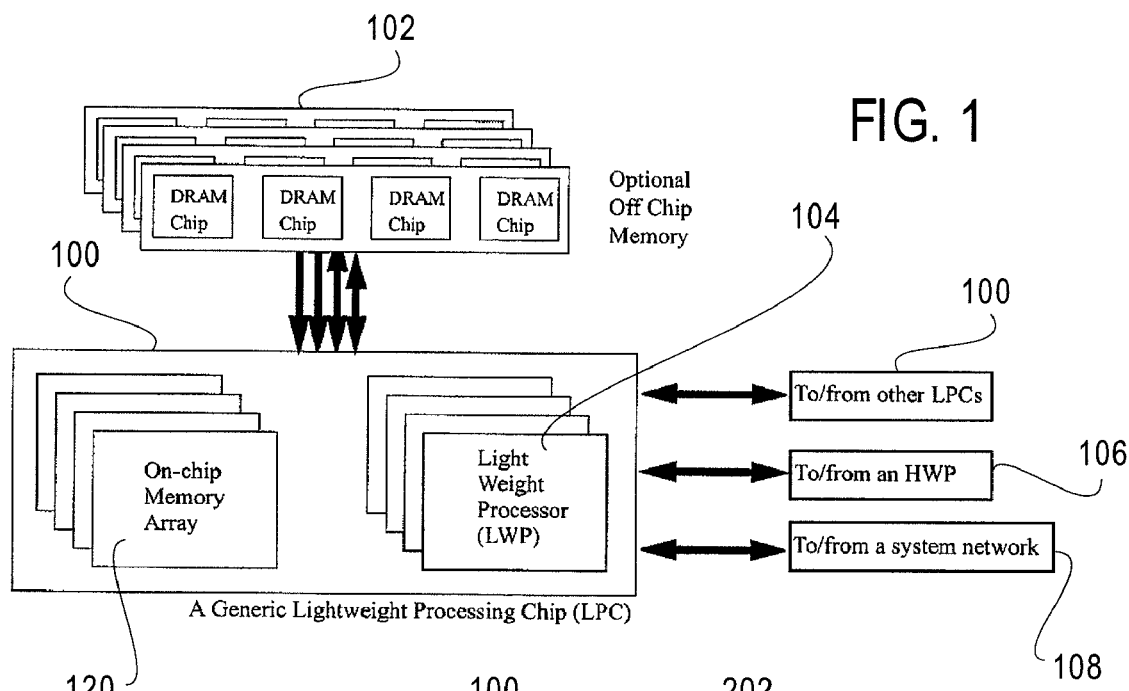
FIG. 1 is a schematic diagram of a lightweight processing chip (LPC), in accordance with various embodiments of the present invention.

In the following detailed description, reference is made to the accompanying drawings which form a part hereof wherein like numerals designate like parts throughout, and in which is shown by way of illustration embodiments in which the invention may be practiced. It is to be understood that other embodiments may be utilized and structural or logical changes may be made without departing from the scope of the present invention. Therefore, the following detailed description is not to be taken in a limiting sense, and the scope of embodiments in accordance with the present invention is defined by the appended claims and their equivalents.

Various operations may be described as multiple discrete operations in turn, in a manner that may be helpful in understanding embodiments of the present invention; however, the order of description should not be construed to imply that these operations are order dependent.

The description may use perspective-based descriptions such as up/down, back/front, and top/bottom. Such descriptions are merely used to facilitate the discussion and are not intended to restrict the application of embodiments of the present invention.

For the purposes of the present invention, a phrase in the form "A/B" means A or B. For the purposes of the present invention, a phrase in the form "A and/or B" means "(A), (B), or (A and B)". For the purposes of the present invention, a phrase in the form "at least one of A, B, and C" means "(A), (B), (C), (A and B), (A and C), (B and C), or (A, B and C)". For the purposes of the present invention, a phrase in the form "(A)B" means "(B) or (AB)" that is, A is an optional element.

The description may use the phrases "in an embodiment," or "in embodiments," which may each refer to one or more of the same or different embodiments. Furthermore, the terms "comprising," "including," "having," and the like, as used with respect to embodiments of the present invention, are synonymous.

Embodiments of the present invention provide a class of computer architectures referred to as lightweight multi-threaded architectures (LIMA).

More particularly, embodiments of the present invention provide new techniques that make up the key characteristics of a LIMA system. While in many cases a particular implementation or bit assignment may be used for expository purposes, a person skilled in the art will recognize that other implementations follow directly from the techniques described herein. The techniques relate to at least three areas: enhancements to the semantics of memory, and integrating those semantics with threads and the state of threads that reference memory; enhancements to the ISA that greatly reduce the state of a thread and allow programs, especially multi-threaded programs, to leverage these new memory semantics for expressing new levels of concurrent operations; and enhancements to microarchitectural techniques that allow programs that employ these ISA techniques to actually achieve increases in true concurrency and reductions in latencies. In addition, these techniques are ideally suited for implementation using modern VLSI chip technologies such as multi-core chips and PIM chips.

The vast majority of modern computers treat memory as some logical array of information containers called words. Each word contains storage for some fixed amount of information, expressed in bits. This information may be copied or changed by a program, but as far as the memory system is concerned, the interpretation of the bits is totally up to the program. With one exception, the particular values within the word have absolutely no effect on what the memory does when presented with a read or write request from such a program. The exception may be additional bits that do not contribute to the information content of the word, but rather to the reliability of the actual value being read out. Such extra bits often go by the term of parity or error correcting code (ECC) bits. Such extra bits may be checked by the memory before delivering the information bits back to the CPU, to ensure that these information bits were in fact the ones last written into the location by the program.

In accordance with various embodiments of the present invention, additional semantics or meaning are added to the information present in a word, and done so in a way that allows such interpretations to be done most efficiently at the memory where extended latency and other performance hampering problems may be avoided. Further, in accordance with various embodiments, the kind of semantics that are added are fundamentally different to that previously developed in that it addresses not just how the data ought to be interpreted, but rather what is the state of the data, and who may be waiting for it.

An earlier generation of computers often called symbolic computers extended the concept of a word containing a string of bits to be interpreted by the CPU by adding some additional tag bits to each word in the memory. These bits of information did not affect the string of bits recorded in the main part of the word, but did give the accessing CPU additional information as to how to interpret those information bits. Such additional information, often called metadata, told the CPU something about the representation of the information bits as a value, or something about how that information may be placed within a simple data structure. In the former case, the tag indicated if the bits represented an integer, a floating point number, or part of a larger multi-word number. In the latter case the tag indicated if the information was a pointer to another data structure of some sort (e.g. to a symbol, a character string, an invisible forwarding pointer to some other word), a list entry where the information is one half of a list cell, or a pointer to a combination of values and code that represents an expression that "has not yet been evaluated" (variously called a closure, a promise, or a future).

The crux of the innovations discussed here for a LIMA system rest in the ability to do several things: add new capabilities and functionality that may be controlled by these "extra bits" that are included in each word, particularly functionality that works directly with the state of threads that are trying to access such words; design the semantics so that the bulk of this "interpretation" of a word and its extension information may be moved much closer to the memory, where it can have more immediate access to the memory (and thus lower latency), and reduce the time when that memory may have to be "blocked out" from access by other requests; and permit simple mechanisms to "wake up" computations in very short time-frames when certain events happen without very specialized programming, such as polling loops, that can consume computational resources and clog memory networks.

A key difference between techniques described herein, in accordance with various embodiments, and other techniques is that no extra tables are needed to contain the additional state information, meaning that a memory reference may be handled by dealing just with the contents of the addressed location, and not having to go elsewhere.

In accordance with various embodiments, these new memory semantics are enabled by adding a minimum of one extra extension bit to each word of the memory. This bit is visible to the program in that its value both changes the way instructions perform their actions, and in turn can be changed by instructions.

The extension bit, in accordance with various embodiments, may take on two values, full and extended, that control the interpretation of the data bits in the word when a load or store operation is performed to it. A full value indicates that the data part of the word is in fact a normal value as would be found in any normal memory system today. Thus, if all of a memory's extension bits were set to normal, then a typical computer program would see no difference than what one sees today.

An extended value indicates, however, that there is currently no value in the memory word, and that instead the bits in the word provide metadata as to where and/or when the value to be associated with this word may be found.

In accordance with various embodiments of the present invention, this extra bit allows some logic, separate from the CPU functionality, to be positioned near each distinct physical subset of memory (either on a memory die, on a memory card interface chip, in a memory controller chip, or even at the memory interface of a microprocessor) to process incoming memory requests from a CPU differently depending on the value of the extension bit, without detailed CPU involvement.

When the extension bit is set to extended, in accordance with various embodiments, the bits within the normal data part of the word may be reinterpreted to define a particular state that the location may be in. In accordance with various embodiments, these states may fall into three general classes: the location contains a special value; the location contains some sort of access control information; and the location is some variation of an "empty" value that allows for program notification when an event occurs. Thus, in accordance with various embodiments, the code opposite "full" is not just "empty."

In accordance with various embodiments of the present invention, a special value is one that in some sense is "unexpected" by a program that has attempted to access a memory location, especially by a read operation. Normally a read access simply returns all the bits in the targeted word, and returns them to a register in the program's machine state, where other instructions will "interpret" the meaning of these bits as they see fit. However, in some cases, it is very desirable to override this program interpretation to relay some specific information about the value. To do this, in accordance with various embodiments, when the extension bit of a word is set, some subset of codes within the data word may indicate that the data returned from this word should be interpreted by the CPU as reflecting a special value. Such codes specify values such as, for example, Uninitialized (U): this word has not yet been initialized to any value by the program. This may be particularly useful on machine power up, when memory has never been touched, and one wishes to prevent programs from reading memory before some valid value has been loaded for the first time. Error code (EC): for some reason no value for this word can be provided, but instead an error code describing the problem is available in the data bits of the word. Empty (E): indicating that some instruction in the program has previously consumed the value that was kept here, and any further attempt to read a value should be delayed until a value is provided. A write to a memory word in this state will change it to full, and leave the data value from the write in the word's data bits.

There are many circumstances where it may be advantageous to have the ability to specify some special actions to happen when a particular memory location is accessed. Classically this may be done by CPU-centric mechanisms such as memory trap registers, or bits in page tables that cover large stretches of locations with the same triggers. The first doesn't scale to arbitrary numbers of words; the second doesn't allow dynamic word-by-word choices to be made. By including appropriate codes in the extended memory state, both problems are eliminated.

In accordance with various embodiments of the present invention, some examples of such codes may include:

Trap on access (TOA): indicating that a reference to this word shall be handled by a separate trap handling procedure, invisibly to the requesting instruction except for an extended response time. Additional metadata in the value field can provide the hardware with information on which handler to invoke. This may be particularly useful when a program is being debugged and the programmer wishes to know where in a program a particular word is touched. It may also be useful for building highly responsive programs where simple changes to memory can trigger specific actions, without having to change the code that is accessing the memory location.

Locked (L): any attempt to access this word by "normal" accesses (especially writes) is to be rejected. This is useful when changes to memory, especially to multiple locations, need to be done in a very predictable and provably correct fashion. All such locations can be locked, the changes made and checked, and then the locking released.

Forwarding pointer (FP): the data to be associated with this word is actually to be found at some other memory location, and any access request to this location should be forwarded to that location, without bothering the original program making the request. In addition, this location is left unchanged so that future requests targeting it will be forwarded similarly. This is a particularly valuable capability for many modern programming paradigms such as object-oriented programming.

Forward value and leave empty (FVE): as in forward, any attempt to access this word shall be forwarded to another location, but in addition, when the request is a write, this location should be converted to the empty state after the forwarding has occurred. This provides a simple mechanism to handle the most frequent producer/consumer situation, where there is a single consumer, and that consumer has issued a read to that location to get the next value—before the producer has provided that value. By leaving such a pointer in the word, when the value arrives, it is immediately forwarded to the desired destination, without the consumer having to do a complex polling or other bandwidth-wasting process to figure out when the data has arrived. However, by changing the original word to empty, both the producer and consumer are free (as they should be) to either deliver a new value to the location, or come back with a request for the next value.

Forward value and leave full (FVF): as in forward, any attempt to access this word shall be forwarded to another location, but in addition, when the request is a write, this location should be converted to the full state after the forwarding has occurred, with the value in the data field to be taken from the write. This is similar to the forward value and leave empty, but is most suitable for post/wait situations such as in synchronization mechanisms where the fact that the producer has produced the value needs to remain in place.

Forward value and leave locked (FVL): as in forward, any attempt to access this word shall be forwarded to another location, but in addition, when the request is a write, this location should be converted to the locked state after the forwarding has occurred. This is similar to the forward value and leave empty, but is most suitable for situations where only single access is to be granted to some value, and an explicit removal of the lock is performed only after the first access has completed its function.

Another key, but separate, part of the innovations described herein, in accordance with various embodiments, is the purposeful integration of full/empty semantics for memory words into the basic operation of instructions executed by a program thread. While some of the details will be described later herein, the following exemplary set of extended memory states (plus the forwarding states described earlier) provide a basis for such fundamentally new capability:

Pending reply (PR): This memory location is part of some active thread frame (such as a register for that thread), and has been the target of a memory access instruction from that thread that has not yet completed. This state will be changed when this request comes back from memory, either with a full state or an error state.

The memory access instruction may have been either a read-like operation, where a copy of some remote memory location is to be copied into this location, or a write-like operation where this location is to be filled by a status code of some sort only where the system has ensured that the remote memory location has in fact been changed.

For diagnostic purposes it may be appropriate to include in the value field of this word information about the memory request, such as either the address of the instruction making the request (often called the Instruction Pointer or IP), or the remote address to which the request was made.

This state becomes useful when the word is directly accessible to some thread (particularly the owning thread), and the program that the thread is running has requested that it be filled with a copy of some other location. By leaving behind a code that indicates the request is still in progress, the thread can check as required on the progress of the request. For systems such as very large massively parallel DSM machines, such codes allow large numbers of "remote references" to be made by a thread, without having to have an expensive CPU state to track the requests.

Blocked pending reply (BPR): as in the pending reply state, but in addition, an indication is in the word that at some time since the request to copy a value to this location was made, the owning thread has attempted to read the location, and is currently blocked from execution until the value is provided. When the value comes back, information in the word allows the system to restart the specified thread.

This is particularly useful when a thread finally reaches a state where it cannot advance until the requested value has come back. By setting this code, the thread is reawakened when the value comes back without having to have some computationally expensive process such as a polling loop.

Blocked pending data (BPD): This memory location is part of some active thread frame (such as a register for that thread), and was initially empty before this owning thread attempted to access it as a register value (as will be described later), and as in the BPR the thread has reached a point where it could not advance execution until the location's value has changed. Consequently, the thread is blocked, and by leaving this state behind, the thread can be reawakened when the location is touched by some other access.

This state allows for full/empty semantics to be used for producer/consumer relationships between two different threads, where the thread owning the register empties the register, and provides some other thread with the address of that register. When that other thread writes into this register, the register's state is changed to full. If the owning thread had tried to consume the value before it was made available, it would have been blocked only at the time of access, and then reawakened when the data has been provided.

There are at least two ways of recording the identity of a blocked thread in a location. First is as some sort of an address that the system knows is associated with a thread, and second, if there is some sort of one-to-one relationship between a thread and this memory location, then a single bit in the code can indicate the associated thread is blocked. It is also possible to have both variations encoded in the same word at the same time.

The innovations in ISA proposed herein as part of LIMA, in accordance with various embodiments of the present invention, have as their goals:

supporting increased concurrency, both in the number of active threads and in the number of active memory references per thread, providing threads with "locality awareness" that allow them to actively specify some memory region which better fits their program's needs in terms of such locality, and then the ability to "move" the computation associated by the thread to that region, reducing significantly the cost of communicating between threads when necessary to implement key latency-intensive global parallel program constructs such as synchronizations, barriers, and collective operations, and/or simplifying the recording of exception information and exception handling.

These items are done by innovations, in accordance with various embodiments, in the following areas (several of which overlap):

reducing the state required to support an individual thread to the point where all of it can be moved to and from memory simply, as necessary to free up CPU resources for other threads, giving all thread registers that are programmer-visible complete extended memory semantics, by making them correspond to memory addresses at all times, augmenting the ISA to directly address the extended states of memory in general, especially to allow very low cost synchronization between threads through load/store access to their registers, redefining memory operations to permit a very relaxed memory consistency model in the hardware that places almost no constraints on the completion of one memory access before starting another, but still allows simple software sequences to implement any desired policy, utilizing several of the extended memory states in particular to allow threads to read and especially write to other threads registers, and to allow thread programs to block on registers until such writes occur, and/or utilizing these extended memory states to provide detailed exception information and simplified exception processing, without the need for additional thread state resources.

A characteristic of a LIMA ISA, in accordance with various embodiments of the present invention, is that the state required to execute a thread may be explicitly divided into at least two pieces: that which is a property of all threads that may execute on behalf of some application, and that which is explicitly part of a particular thread's execution. The first includes global state information that may affect many or all threads associated with a program. Such state may be either visible (such as translation and routing tables, machine identification and configuration registers) or invisible (such as TLBs, caches, and other similar mechanisms). The second includes only an all local thread state that totally defines the correct operation of just this thread's program execution. By focusing on separating the two parts, and shrinking the size of the latter, an ISA may be provided where the costs involved with starting and managing a large number of threads is minimal.

A LIMA ISA is further defined, in accordance with various embodiments, so that substantially all such local thread state is program-visible (program counter, thread status information, working registers), with no need for hidden state such as instruction pools, reservation stations, or load/store queues that are required in conventional implementations to permit multiple concurrent activities.

This local thread state, in accordance with various embodiments, is further defined to be representable to the rest of the system as a block of memory, usually in a region of memory that may contain many such blocks. Such a block may be referred to as a thread frame and may be said to be free if no thread currently claims this storage for its use. As long as this region of memory has free frames in it, then additional threads may be initiated. This is different from current ISAs where registers are distinct from memory, and may be part of an active thread only if it logically, and physically, resides in a register file within a CPU core.

In accordance with various embodiments of the present invention, a thread frame may thus be in one of at least three states:

active: it contains the registers for a thread that is free to execute instructions at the current time;

blocked: it contains the registers for a thread, but where the execution of that thread is blocked because some program-specified event has not yet occurred; and free: it does not contain any thread state, and may be manipulated at will by the rest of the program, just like any other block of memory.

In accordance with various embodiments, a normal application thread is created in response to the execution of some other instruction or short sequence of instructions in some other thread that takes a free frame from memory, initializes its contents to some starting condition, and then marks the thread to the system as active. It is a property of the ISAs defined herein that the costs of such operations are low enough to be packaged in a very few, ideally one, instructions.

Once started in a frame, in accordance with various embodiments, a thread normally remains in the active state until it either declares its useful life is over (in which case the frame it is using becomes free), or the thread executes some instruction that expects some event that has not yet happened (in which case it blocks until the event occurs).

In accordance with various embodiments, being in the active state does not mean that instructions are right now being executed in its behalf, only that given some (hopefully fair) scheduling policy, the thread is guaranteed at some time in the future of having instructions executed in its behalf.

Given that a thread frame is memory, then all registers inherit the extended memory semantics discussed earlier herein. A key part of the innovations described herein, in accordance with various embodiments, are that many of these now extended register semantics are visible to a programmer through the ISA, and provide unique functionality.

It is assumed for discussion that a LIMA ISA, in accordance with various embodiments of the present invention, looks like a fairly conventional Reduced Instruction Set Computer (RISC) ISA in format. Registers provide operands for function units, and are the target of those same function units. Registers may also be used in the computation of memory addresses, and as the source and target of stores and loads.

Adding extended semantics to registers changes in important ways the effects of register contents on instruction execution. In accordance with various embodiments, when a register's extension bit is set to full, it functions just as a conventional register without an extension bit does—it provides a value to a function unit when called for by an instruction. It may also be overwritten by a result from a function unit.

When the extension bit of an instruction's source register is set to extended, however, operation of the instruction changes, depending on the state of the register.

Some example cases, in accordance with various embodiments, are as follows:

exception code: Whatever process was in charge of producing the value that was supposed to be found here was unable to do so, and left a code behind describing the reason. Depending on the ISA, detecting such a condition could cause an exception, or perhaps propagation of an error code to a destination of the add;

empty code: The current instruction cannot proceed further into execution until the word has been filled. This would typically be done by a prior instruction that explicitly emptied a register that is also visible to some other thread, and which will be used as a producer/consumer synchronization point; and pending result: As in empty, the current instruction cannot proceed further until the word has been filled. In accordance with various embodiments, there are at least two uses for such a code. First, the register may be the target of a "load from memory" instruction issued by this thread, but which has not yet been satisfied from memory. The code within the register in this state may then contain additional information such as the address of the memory location being fetched. Second, a high performance "out-of-order" execution microarchitecture may also wish to utilize this to indicate that the register is the target of some operation that has been dispatched to a function unit, but that the result is not yet available.

In the case of an error code, in accordance with various embodiments, the thread instruction execution cycle may decide to invoke an exception handling mechanism. This may involve checking if the kind of exception reported in the register should cause an exception to be raised and the thread's execution redirected into an appropriate exception handler, or if the exception should be simply passed to the operation, and "poison" whatever operation is to be performed by replacing it with another exception code.

In the case of an empty or pending result, in accordance with various embodiments, the thread has no reason to be diverted to an exception routine, but cannot advance properly because a needed input value has not yet been provided. In such a circumstance, an attractive alternative, in accordance with various embodiments, is to modify the state of the register to have a thread blocked modifier on it, and suspend further instruction issues from this thread. When the expected value arrives at the memory location corresponding to the register (either from a function unit or as a response from memory), the thread blocked modified indicates that the thread whose frame this register resides is in a blocked state, and as a side-effect of writing the value into the target location, the associated thread state is changed from blocked back to active. The thread restarts at the same instruction that caused the original blockage and the registers are rechecked. If some other input register is also empty, then the instruction will block again until that register also has a value. If the result that freed the thread was in fact an exception code, then the thread will enter its exception handling mechanism as described above.

This same testing process, in accordance with various embodiments, may be applied to any register which is the target of an operation specified by an instruction. If there is an exception code in it, an exception is raised for the instruction trying to use it. If the target register is empty pending a return of a previously requested value, then the thread is blocked until the value returns into the register. This is to help prevent a race condition where an earlier value will overwrite a later one.

In accordance with various embodiments, only when the target register is either empty (but not expecting a return value) or it has a valid value in it, may the instruction proceed. If the new value can be computed trivially, such as from a simple immediate or integer arithmetic logic unit (ALU) operation, the target is overwritten with the new value (with the extension bit set accordingly).

If, however, the specified operation will take a significant period of time to compute, then the implementation may, in accordance with various embodiments, decide to have the target's register state set to either empty or pending, and if the latter, perhaps with an extended code that says from where the value is expected.

In either case, the thread then continues with its next instruction.

As a side-effect of the availability of the pending state, a LIMA program, in accordance with various embodiments, may issue a load instruction and be assured that the register to hold the result of the load will not be used until the value actually returns. In many cases it is important to have some similar guarantees about stores. When appropriate, it may not be desirable to perform some instruction sequence (especially another store) until it may be reasonably assured that the first store has completed. To solve this, one may change the semantics of a store instruction slightly. As in a load, some register may be specified by the store instruction to act as a target from the response from the write memory operation. This means that this response register is set to "pending" when the store instruction is executed, and the write memory operation is given the address of this register as the target of its response when the write completes. When in fact the write completes, it returns a value to this response register. Several options for the return value are possible, but a very useful one is to have some "value" such as "0" returned on a successful write, and an exception code returned if for some reason the write fails. A "pending" state in the register thus denotes a write still in progress.

As with ALU instructions, whenever a store instruction is encountered during thread execution, in accordance with various embodiments, all of its registers, including this response target, are checked. If any of them have a pending state, the thread is blocked until that register receives a value. This helps guarantee that a response due to an earlier operation of some sort does not improperly overwrite the pending state to be set by this store.

If the return value from the store is an error code, then first touch of that register will cause the exception to be raised, in accordance with various embodiments. There are several ways that an ISA may specify on a store which register is to receive this response. This may include using the register providing the write data, a separate register specified by an extra field of the instruction, the other register of an even/odd pair, or some fixed register.

The above discussion addresses modifications to the semantics of loads and stores in terms of the registers they use within the thread frame. However, if memory has additional states, then the operation of a memory access request from such an instruction may also be expanded to include what happens as a function of the target memory location's initial state.

If that state is full, then the memory access proceeds exactly as in any conventional computer, with the resulting state of the memory still marked as full. Other memory states, however, require different responses, of which several varieties are possible. The following discussion provides one exemplary set of interpretations as a function of the state of the memory when the request arrives, in accordance with various embodiments of the present invention:

uninitialized: reads should return an exception code; writes simply change the state to full;

exception: either kind of operation should return an exception code;

empty: on writes the state is simply set to full; on reads several options are possible, ranging from returning an exception code, to leaving a forwarding pointer to redirect the next write to the desired target location back in the thread frame;

trap on access: a new thread is created (or an existing pending one unblocked), with the parameters from the memory access recorded somewhere where the trap code can access them;

locked: in either case, an exception code is returned;

forward: the memory request is forwarded to the designated address, where it will be handled just as if it had been targeted there to begin with. The state of the original target location is unchanged;

forward and leave empty: just as with forwarding, but when the memory is either in an extended state and/or a on the first write, the state of this location is changed to empty;

forward and leave full: as in forward and leave empty, extended to allow different interactions with an extended state but for the first write, also leave the value behind in the memory location, and change its value to full;

empty and thread blocked: on a write to this location, the value in the write should be deposited in the location, and the thread of which this register is part should be returned to the active state; and pending and pending and blocked: this represents an odd situation where the target location is a register in some other thread frame, and that thread has issued a memory request which is also currently in progress. A variety of implementations are possible, with perhaps the most direct simply to return an exception code to the thread making the original request. What should restart such a thread is not a write from another thread but the return of the status from the operation triggered by this thread's instruction.

To fully utilize the potential of the extended states possible for memory (and registers in other thread frames that "look like memory"), a LIMA ISA, in accordance with various embodiments of the present invention, includes an extended suite of memory reference instructions besides just the conventional loads and stores described above herein. Examples of some of these are as follows:

Load if full, load if full and leave empty: the request is performed only if the location is full when the request arrives, and is blocked if it is empty (perhaps changing the state of the target to forward or forward and leave empty). If the optional "leave empty" operation is specified, the target is left in the empty state after a successful read;

Store if empty: the write generated by this request succeeds only if the target is currently one of the empty states;

Load and Store Extended: the state of the target location is immaterial. On a load extended a copy of all bits including the extension are returned to the thread. On a store extended, both a value and an extension bit are written into the location, regardless of its prior contents; and Atomic Memory Operations (AMO): perform some sort of a read-compute-write at the memory location, such as a test and set, compare and swap, add to memory, etc. A value, usually the prior value of the location, is returned to the requesting thread, while some new value is deposited in the target location. No other memory access operation is allowed to this location while this AMO is in progress.

In addition to loads and stores that are aware of full/empty states of memory, a LIMA ISA, in accordance with various embodiments, may also include options on some or all of its more classical register-to-register instructions to modify the state of registers.

One example, in accordance with various embodiments, provides instruction options on source or target registers based on their state. For example, a use-and-empty option on a source register resets the register to empty once an instruction has successfully been issued and the value passed to the appropriate function unit, or send to memory as a store value. This provides "single use" semantics to the value in a register.

Another example, in accordance with various embodiments, a write-if-empty option on the target register of an instruction may actually block the thread from proceeding until the target register is empty (rather than full as specified previously). A program utilizing such an option may be depending on some other thread to empty one of its registers in some sort of a producer/consumer relationship. A major problem with implementing such an instruction is how to block the thread if the register is full at the beginning of the instruction sequence. Thus, additional state codes may be necessary.

In addition, if registers have such extended states, it may be worth, in accordance with various embodiments, augmenting the ISA with instructions that explicitly test the state, not the value, of a register. Such instructions might include, for example:

Branch if full, branch if extended, branch if an exception code, etc: Test the state of the specified register and branch accordingly. This instruction does not block or raise an exception on registers in a non-full state;

Call-if, Trap-if, etc.: Similar to the above branches, but either perform a subroutine call or start a trap if some register is in some state; and Stall on Address Match (STAM): If some STAM-specified register is still in the pending state (due to an earlier memory operation that has not yet completed), and if the definition of pending includes leaving an address behind in the register, then a STAM instruction will block on that register if an address provided by the STAM "matches" it (where "match" may be somewhat loose if there is not room in the pending state for a full address). If the register was initially not pending, or there was a clear address mismatch, then thread continues execution.

If the thread is blocked at the STAM, then any modification to the register, especially the return of the response from the prior memory request, will restart the thread, and the STAM is repeated. The use of this instruction is described in the next instruction.

One result of this kind of register-based tracking of pending results is that a program may keep as many independent long-duration operations pending as it has free registers, and yet be perfectly assured that when instructions that need the results are executed, they will in fact suspend until the results are available.

For operations utilizing long-latency function units or independent loads, this works very much like a highly concurrent out-of-order superscalar machine, but without any fancy or hidden result tag matching needed.

For operations involving a mix of loads and stores, a LIMA ISA, in accordance with various embodiments of the present invention, need provide no direct guarantees as to the relationship of the order of completion of memory operations to the execution of other instructions within the thread program, other than those dictated by joint register dependencies. The only time that one memory access instruction is guaranteed by the ISA to not issue a memory request until an earlier operation from an earlier instruction has completed, is if the response target register from the earlier instruction is used as one of the registers for the later instruction. If this is in fact the case, then the second instruction will block until that register has received a response from the earlier request, guaranteeing that it has completed. If this is not the case, then the second memory operation is not prohibited from issuing regardless of the status of the first operation.

While explicit register dependencies may be used to ensure a precise ordering between issuing and completing memory operations, in many cases such constraints are too confining, and will constrict concurrent operation unnecessarily. Clearly if the compiler knows that two memory operations (such as a load and a later store) have two unrelated addresses, then it is free to use separate registers and at least permit the potential of concurrency in the memory operations. If, however, the compiler cannot be sure (as is the case many times with C-language pointers), then other features of a LIMA ISA, in accordance with various embodiments, such as the STAM instruction described earlier, allows for a simple run-time determination of the safety of concurrent memory operations. For example, it is assumed that the first of two potentially conflicting memory instructions accesses memory location A, and uses register i as its target for the response code. It is also assumed that the later memory access instruction will use an address B as its target. A STAM is then inserted just before the second memory instruction, where the STAM looks at register i and compares it with address B. If either the first operation has completed, or the addresses are different, then the STAM completes immediately and the second memory instruction is unconstrained. If there is a potential conflict in addresses, then the STAM blocks until the operation completes.

Finally, in accordance with various embodiments, the same mechanism used for long-latency memory operations may also be used for long-latency function unit computations. This allows for a thread to continue issuing instructions long before some lengthy logic computation can be completed, without giving up on tracking the completion of the result.

Threads in a system, in accordance with various embodiments of the present invention, need to be managed throughout their life cycle, from creation, through active and blocked states, to termination and freeing of resources. The following portions describe attributes of such facilities, in accordance with various embodiments.

One of the novelties of a LIMA system, in accordance with various embodiments of the present invention, is that the number of threads that may be instantiated is architecturally limited only by the amount of memory allocated to contain thread frames. Exactly how the underlying system keeps track of free or active frames is a property of the underlying microarchitecture, but a requirement of a system described herein is that it be able to do so in at least one fashion without extra thread state.

To do this it is assumed here that each thread frame has at least one register that is part of the frame, and thus known to the program, but largely untouched by normal instructions. This register, referred to here as a frame pointer (FP) and nominally register 0, is used to chain threads together in linked lists. In an embodiment, an implementation that uses two such registers for doubly linked lists may also be of value to some implementations.

It is also assumed that the underlying hardware, as part of the global machine state, has one or more registers that contain pointers to the heads of lists of thread frames that are currently free, and are linked to each other via their FP registers. Such registers are referred to as free list registers (FLR).

It is also further assumed that in the global machine state are one or more registers that point to lists of thread frames containing active threads, referred to as active list registers (ALR). As discussed later herein, there may be several such types of "active" thread lists.

In addition, the mechanisms described herein also scale to implementations where there may be multiple hardware processors (perhaps a very large number), each of which happens to be "near" some particular chunk of memory. In such cases, a LIMA architecture, in accordance with various embodiments of the present invention, not only allows each of these processing cores to have its own set of FLRs and ALRs, but also leverages them to advantage, as discussed later herein. Unlike the FP, however, depending on the underlying microarchitecture and implementation, these FLRs and ALRs may or may not actually have physical instantiations. However, it is assumed that they do, in order to simplify the description of the semantics of the instructions.

The basic thread creation process normally involves the execution of an instruction or instruction sequence that performs the following:

De-linking from an FLR an address of a thread frame that is not in use by any other thread;

Writing into that frame a basic set of register values, in particular an initial program counter; and Signaling to the hardware that this new frame may now be marked as active, and placed on a list controlled by an ALR.

In large systems where memory and processing resources are scattered throughout a large physical volume, it may often be advantageous to request that a frame be created "near" some segment of memory known to be of direct interest to the thread that will be started in this frame.

To do this, in accordance with various embodiments of the present invention, at least two kinds of thread creation instructions or instruction sequences in a LIMA ISA: fork and spawn are defined. A fork is location-agnostic; creating a frame wherever it is most convenient, usually "near" the current processor executing the fork instruction. A spawn, on the other hand, identifies a memory address "near which" the new thread is to be executed. Nearness in either case may simply refer to the FLR in global machine space that is maintained by a processor core "near" some memory.

Spawns in general may be useful when the parent thread knows that most of the memory operations to be performed by the child thread will be to memory "near" some known address (as in accessing the components of a sequentially allocated object), and thus starting the child thread "near" the physical memory holding that address will reduce observed latencies in accessing the object.

In either of the above cases, the full process of allocating a new frame to the thread being created involves reading an FLR, and returning its value to the rest of the thread creation process. This process will then read out the FP register from the frame, and place its value back into the FLR. This provides a pointer to the next free frame from the next thread creation.

In accordance with various embodiments, it is important that this process of de-linking one frame and re-linking another be atomic, that is, no two different creation events should ever receive a pointer to the same frame. This may be done either by hardware at the FLR or by assuming that each FLR has extended memory semantics, and may be atomically read and locked or read and emptied. In the latter case, a "read and empty" memory request sent to the FLR will atomically read the pointer to the first free frame, and leave behind a location with an empty state. The thread doing the read may then use the pointer to read the FP register of the designated frame, and do a write of that value back to the FLR. If in the meantime a second request for a free frame had arrived at the FLR, this request could be blocked, and the state of the FLR changed to "forward and leave empty." In this case, the write back from the first request will change the FLR back to empty and forward the new value to the target of the second waiting thread, where it can now repeat the process.

In accordance with various embodiments of the present invention, the creation process usually transfers some operands from the parent to the child, allowing the child to have whatever information about the parent, such as the address of the parent's frame, the parent wishes to transfer. This allows the child to communicate back to the parent either through some shared storage or, as will be discussed later, directly to the parent's registers (again the ability to have registers take on extended memory semantics provides an extraordinary capability for this).

However, it is highly desirable for the parent to have similar knowledge of the child, so that parent to child communication may be performed. Given that all frames are aliased to memory, providing the parent with the frame address where the child is created yields such a path. If the address is provided by the time the child is made active, then the parent may write directly into child registers for direct communication.

There are a spectrum of different ways that a fork or spawn sequence may be performed via instructions in a LIMA ISA, in accordance with various embodiments. At one extreme, the entire action may be bound up in a single instruction; at the other a short series of simple instructions may be possible.

At the first extreme, in accordance with various embodiments, a single instruction may specify a target location near which the creation should occur, a new program counter, and some number of initial register values (such as copies of some of the creating thread's current register). A response register may be identified as in a store to receive a response to the creation event. In execution a memory frame create request (in format much like a multi-word store or a cache line write) is sent to the target area, a free frame de-linked, the values in the request copied into the frame, and the frame made active.

At the other extreme, in accordance with various embodiments, the same sequence may be created from a sequence of simpler instructions. An initial AMO-like instruction may be sent to the appropriate FLR that returns a copy of its contents, and leaves the FLR either locked or empty (as discussed previously herein). When the address in the FLR arrives back in the creating thread, it may be tested for non-null, the contents of its FP may be read via a conventional load, and then written back to the FLR, to either de-lock it or return it to a full state. After this a series of writes to the new frame may initialize the registers in whatever way the creating thread wishes. Finally, either a new instruction initiate may then be addressed to the new frame, with the effect of making it active, or a pair of AMO read and write instructions may update the appropriate ALR.

A key difference between the two sequences is in the time taken to create the new thread and in the time during which an FLR and/or ALR is "locked out" during an update. The single instruction case is clearly the fastest, with a total latency approximating one round trip between the creating site and the site of creation, plus perhaps the time at the site of creation to read the needed free list information from the free frame back to the ALR (microarchitectural tricks such as making the FLR some sort of pool might eliminate much of the latter). In contrast, the simple instruction sequence approach might require up to 6+N round trips where N is the number of registers to be loaded.

Also, the fact that the single instruction approach handles the FLR and ALR updates locally, rather than via a series of potentially remote memory operations, greatly reduces the time during which these facilities are potentially unavailable to other requesters. It also permits more sophisticated microarchitectural approaches for maintaining lists of free and active frames to be hidden from the program level.

Note also, however, that in the latter case of multiple simple instructions, the FLR need not be a hardware register, but simply some memory word.

Intermediate implementation approaches are also possible, in accordance with various embodiments of the present invention, where only a bare minimum of information is transferred by the specialized instructions, but the locking times for the FLR and ALR updates are still kept low. A particularly useful version is where all but the actual initiation happens. This allows the same mechanism to be used for dynamic storage allocation in units of frames.

In any case, the extended state capability and the ability to address a thread state as memory become useful for permitting a spectrum of simple and elegant creation mechanisms, in accordance with various embodiments.

Even with a large memory-based pool of thread frames, it is possible that at some point in time there are no available frames at the time a creation instruction sequence is executed.

For the "sequence of simple instructions" approach, the program in the parent thread explicitly inspects the contents of an FLR, and as such may determine when there is no free frame.

For the single instruction approach to thread creation, in accordance with various embodiments, a completion code may be returned to the requesting thread's response register, just as in a store, except this time the value returned after a successful creation should be the address of the new frame. Thus, the response register in the parent's frame will be set to empty when the creation request is sent, and becomes full after a successful creation, or receipt of an exception code after an unsuccessful attempt.

The final act of a thread is to terminate its existence. This conceptually involves at least removing the thread from the active state and queuing the frame back onto an FLR. In accordance with various embodiments, a relatively simple terminate instruction may do this by reading the current contents of the appropriate FLR, placing that value into its FP, and writing the frame address back to the FLR. As before, updating the free list should be done atomically, so with some LIMA ISAs there may be a series of instructions needed to do this, with the only action of a terminate instruction then being to remove the frame from the active state. Where and how the frame gets queued for reuse may thus be left entirely to software.

In accordance with various embodiments of the present invention, an extra constraint with a LIMA ISA is that logically a frame should not be released to the free state until any still-pending memory requests have completed (this is to help avoid the potential problem of a response from a memory request coming from the now expired thread arriving after the frame had been reallocated to another thread).

One may assume that a terminate instruction performs a check on all of its frame registers before releasing the frame, and blocking until they are all nonempty. However, this is complex, and again a simpler solution may be to assume a software termination sequence that progressively "touches" each of its registers and blocks until they are no longer pending. In many cases, compiler analysis of the code leading up to the terminate instruction may be able to exclude some or all of the registers from such consideration, thus greatly shortening the sequence.

For various embodiments of the present invention, the following definitions are made:

An exception is a report of a condition that is unusual, such as a divide by zero, a floating-point out of range, an illegal opcode, an illegal address, or some hardware detected event; and A trap is an unprogrammed transfer of control usually performed in response to an exception.

For LIMA systems, in accordance with various embodiments, there is nothing particularly critical about exactly when and how exceptions are recorded, other than where they are recorded ought to be in a register that is part of the program-visible state that exists in a frame. An implementation that mirrors many common ISAs may place such information as "sticky bits" in part of a thread status word (TSW) register that, like the IP and FP, is a specific register in a thread frame.

It is noted, however, that the ability to keep a complete exception code in a register that was supposed to receive some value means that besides just the sticky bit in a TSW, the design of a LIMA ISA may also want to record in the TSW the register where an exception-causing event was last discovered. This may allow software to explore more deeply what was the cause of the problem.

A trap, on the other hand, represents the case where a program has configured itself so that it does not want to continue execution after some specific exception has occurred. Instead, the program is to be suspended, and control passed to another trap routine that will analyze the exception. This routine may be able to redo something so that the program can be restarted, or declare a higher level program error.

There are at least two approaches to implementing the trap process in a LIMA ISA, in accordance with various embodiments. First, in accordance with various embodiments, detection that a trap should be taken could trigger activities similar to a fork. A new thread in the vicinity is created, with its IP and TSW set to those values associated with the trap routine, and one of the trap frame's registers loaded with the address of the thread frame experiencing the trap. This thread is also removed from the active list, leaving all of its registers untouched by the trap process (but still open for ongoing memory operations to return their responses). The trap program is then free to do whatever it wishes to the original frame, and if it becomes time to restart the frame, an initiate instruction may be executed.

While this is an elegant use of the multi-threading capabilities of a LIMA system, in accordance with various embodiments, it does mean that the trap handling hardware process must now worry about what to do if there are no free frames. A second approach, in accordance with various embodiments, that does not have this problem assumes that instead of creating a new thread, a trap simply declares the current thread "inactive," and links it onto some list known to the hardware (much like an FLR). This list head could be polled by an independent trap handling thread that when it detects a new entry, it de-queues the frame and performs exactly the same sequence that the hardware-created thread would have done. In fact, if the head of this list has extended memory semantics, then it can normally be empty, and the trap thread (which was started at start-up) could have attempted to read it, and blocked when it found the location empty. Thus, no machine cycles are used for the polling until a frame address is written into the list head, at which time the trap thread is restarted.

If this trap handler wishes to provide more extended services for the trapped thread, it may then in software create a new trap thread and pass the trapped thread frame to that new thread.

If traps are in fact infrequent, then the response time to this is virtually the same as the hardware-created thread, but without the complexities of an additional thread creation.

Lightweight threads have been described in the art wherein a state may move from processor to processor under program control to take advantage of lower latencies. The state of such threads was defined as approximating the size of a cache line transfer in a conventional system, and as such, are about the same complexity as the light weight threads defined above. This traveling thread model, however, has some significant differences from that described herein. First, the thread's registers are not memory mapped and do not have the kind of semantics described here. Second, in an embodiment, the thread explicitly moves itself entirely to another location, whereas the same functionality (and more) may be gained by spawning a new thread at the target location, and then killing the parent thread. While functionally no different, the practical advantage of this spawn-die approach is that it permits a strong degree of error checking to ensure that nothing happens to the new thread during the transfer from one place to another.

In accordance with various embodiments of the present invention, a system for these concepts is a highly parallel system where the basic building block is centered around a single chip type that has significant amounts of on chip memory and one or more processing cores. In accordance with various embodiments of the present invention, such a chip is generally referred to as a Lightweight Processing Chip (LPC), and each processing core is generally referred to as a Light Weight Processor (LWP). As may be seen in FIG. 1, each LPC 100 may or may not be communicatively coupled to external memory 102 such as arrays of commodity DRAM parts. In such cases, the external memory is controlled by the LPC, and may be accessed by any LWP 104 within the LPC. An LPC and any such associated DRAM chips are generally referred to herein as a section.

An LPC, in accordance with various embodiments, may also have one or more links to other LPC chips 102, more conventional processors 106, a network to other subsystems 108, or any combination thereof. In any case, a thread executing instructions on any LWP in any LPC may perform memory operations that may touch memory associated with the LPC on which it resides, and ideally on memory associated with other LPCs in the system to which it is connected.

Figure 2:
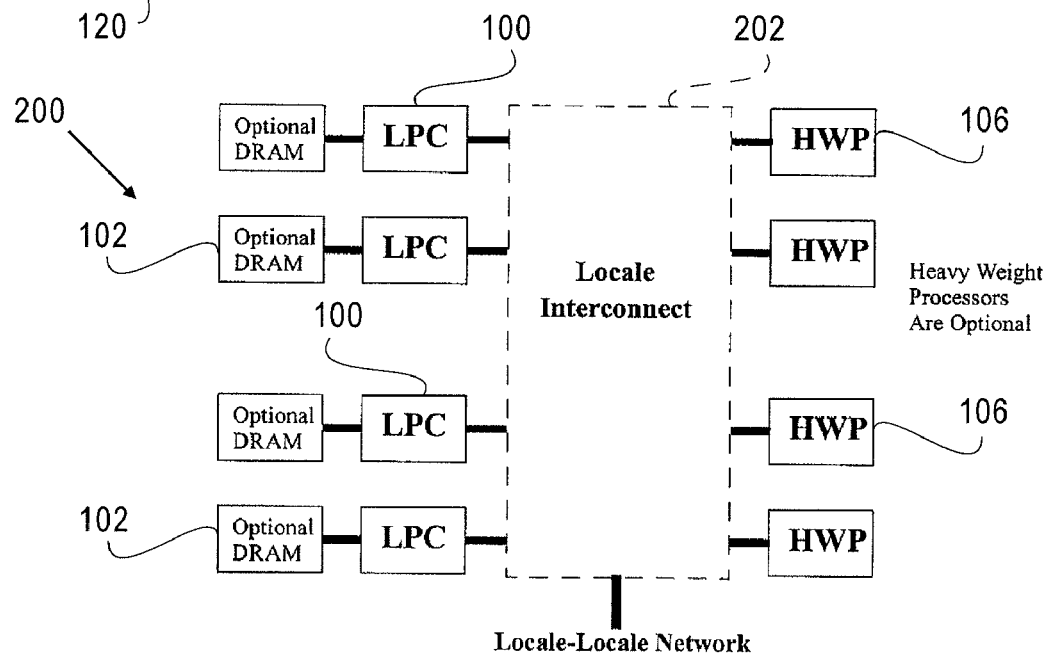
FIG. 2 is a schematic diagram of a locale made up of multiple LPCs, in accordance with various embodiments of the present invention.

If there is a conventional processor tied to an LPC, it is referred to herein as a Heavy Weight Processor (HWP) 106 simply to distinguish it from the LWPs. It is assumed that the HWP may make conventional memory references to memory associated with the LPC. A collection of one or more HWPs, LPCs, sections, and other chips such as routers that allow access to a bigger network is referred to herein as a locale or node 200 (See FIG. 2). The collection is communicatively coupled via a locale interconnect 202.

Figure 3:
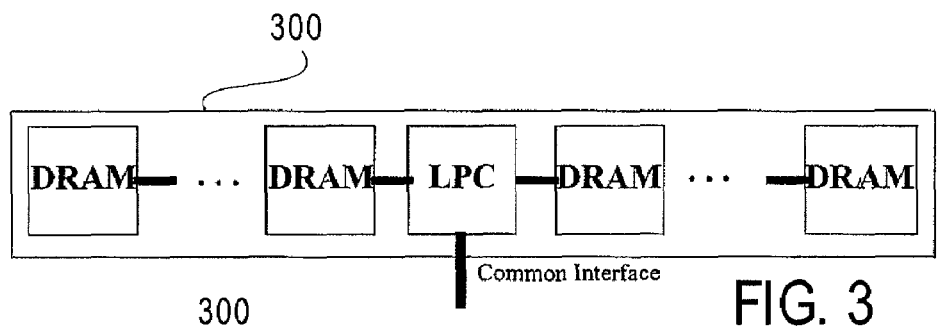
FIG. 3 schematically illustrates a module with a single LPC, in accordance with various embodiments of the present invention.
Figure 4:
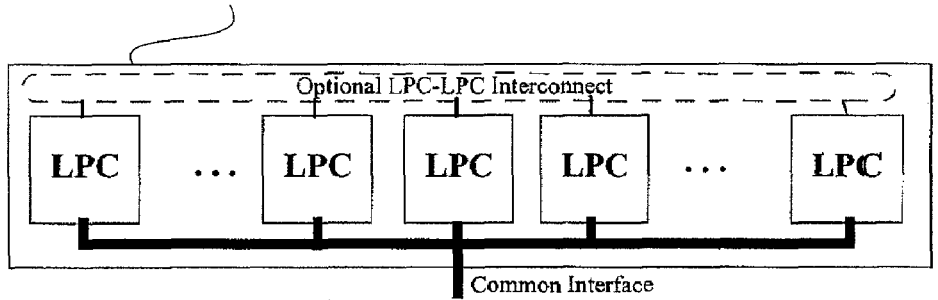
FIG. 4 schematically illustrates a module with multiple LPCs, in accordance with various embodiments of the present invention.

In locales 200 with multiple LPCs, the LPCs may be uniformly distributed throughout the system, or they may be arranged hierarchically, with some set of LPCs fairly closely linked physically, such as on a common memory module 300 much like a commonplace DIMM module (dual in-line memory module). This may range from one LPC and its associated DRAM chips (a section) (as may be seen in FIG. 3) to multiple LPCs (as may be seen in FIG. 4 when each LPC has significant on-chip DRAM). In fact, the placement of one or more LPCs on a DIMM-like structure may allow such a module to be substituted for a classical "dumb" memory module in a conventional computer system.

In any case, an exemplary model of execution, in accordance with various embodiments of the present invention, includes the following attributes:

Any memory that is visible to a program on one LWP in one LPC is also visible to all other LWPs in that LPC, in that locale, and in the system (i.e. such systems form shared address space machines);

Regardless of on which LWP a thread is being executed, that thread is free to access any memory in the system through memory reference instructions. The total number of threads that may be active at any one time is limited solely by the amount of visible memory allocated to holding thread frames;

An active thread is guaranteed not to be starved, that is, it is guaranteed to at least periodically reach some LWP from which instructions on its behalf may be executed; and Each LWP is ideally a multi-threaded processor capable of executing instructions from some significant number of active threads concurrently. Whether this is inter-leaved or SMT is immaterial.

As may be seen in FIG. 1, an LPC, in accordance with various embodiments, consists of one or more on-chip memory arrays 120 or independent memory macros, one or more LWPs 104, some number of off-chip interfaces, and routing circuitry to interconnect all of these appropriately.

"Independent memory macro" refers to memory circuits that form arrays of memory cells with enough support circuitry to allow for independent operation as a separate memory subsystem. Thus, each such memory macro may accept a separate address, access the matching word within the module, and present the contents back to its interface.

Depending on the technology being used to fabricate the LPC chip, and the system objectives, each such memory macro may represent a separate region of program visible memory as seen by the rest of the system, or as a cache for program visible memory that is off chip, especially for memory that may be implemented by sets of separate commodity DRAM parts.

In any case, in accordance with various embodiments, one aspect of the control logic of these memory macros which is a bit different than that of conventional designs is the requirement for them to perform the small amount of processing associated with examining the extended state of a word when it is referenced, and modifying accordingly the actions taken in support of an incoming memory request.

Figure 5:
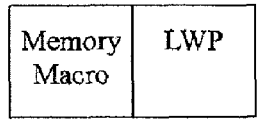
FIG. 5 schematically illustrates lightweight processing core and memory macro on-chip relationships, in accordance with various embodiments of the present invention.
Figure 5:
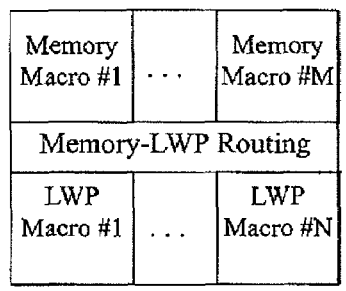
Figure 5:
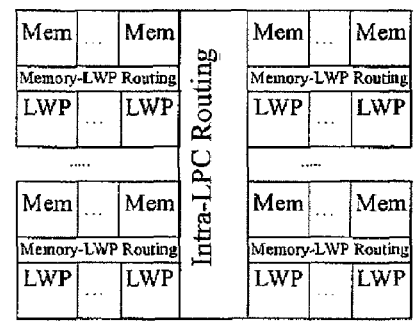

In accordance with various embodiments, the physical relationship between individual memory macros and LWP instances on each LPC may also vary. In a tight 1-1 relationship, as illustrated in FIG. 5(a), there may be exactly one LWP for each independent memory macro, and the two may in fact be directly adjoining each other so that signals from one, especially the memory macro, may literally move a minimum distance into the LWP to be used. This approach minimizes area and latency delays, since a major user of the memory's output is literally right next door. It also allows use of the LWP's data flow to perform the state examinations and modifications needed to support memory references to the memory.

In accordance with various embodiments, a second approach, as illustrated in FIG. 5(b), assumes that a pool of N different LWPs may all directly access M memory macros, where M and N are not necessarily the same. This approach costs more silicon area (for the routing and for the state examination logic), but allows for more concurrently executing threads to be "close" to the same memory, and may be chosen for load balancing reasons. A chip produced by Sun Microsystems referred to as Niagara has such an organization of cores and memory macros (used in this case as cache banks), but without the extended memory states. In accordance with various embodiments, hierarchical combinations (illustrated in FIG. 5(c)) are also possible.

Figure 6:
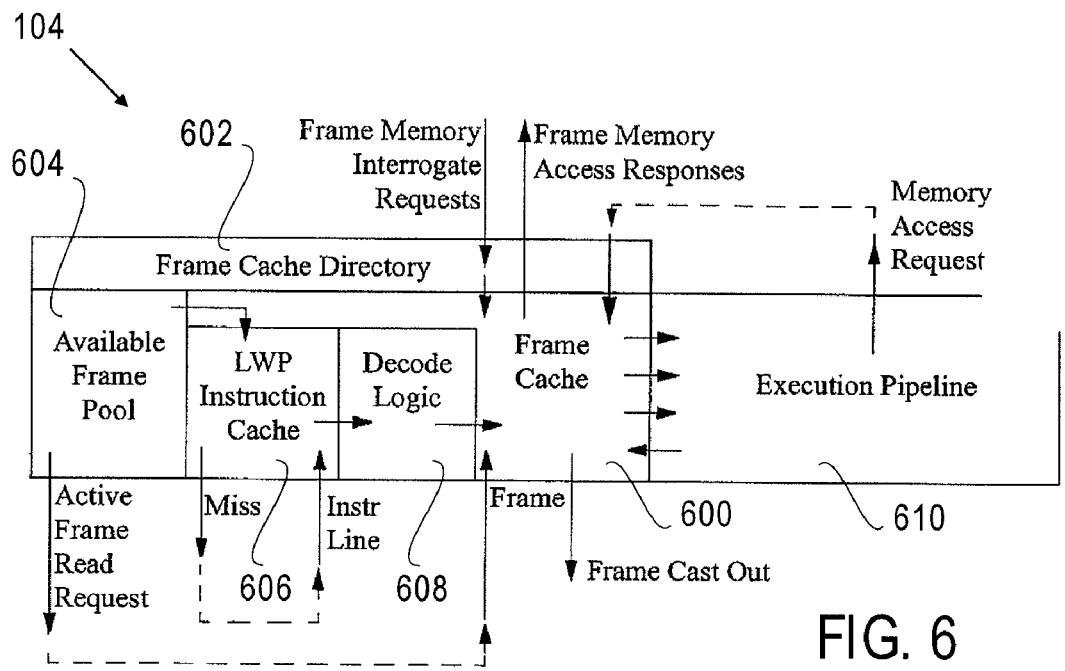
FIG. 6 schematically illustrates an LWP subsystem, in accordance with various embodiments of the present invention.

An exemplary implementation of each LWP 104, in accordance with various embodiments, is assumed to comprise the following subsystems, as illustrated in FIG. 6:

Frame Cache (FC) 600: a cache of some active frames from which registers can be referenced during instruction execution. All frames in the cache have their homes in program visible memory in a region allocated to frames. The values in this cache are more recent than those in physical memory;

Frame Cache Directory (FCD) 602: a set of tags that may be interrogated from outside logic to determine if a reference to a particular word in frame memory is currently held within a frame cached in this LWP. Note as an alternative, the associated memory macros that "own" the memory associated with each frame may keep a reverse directory to point to the appropriate LWP;

Available Frame Pool (AFP) 604: a list of the status of each frame in the FC, and the scheduling logic to decide for which active frame currently within the FC new instructions ought to be executed;

LWP Instruction Cache (LIC) 606: a cache of instructions for the currently active threads;

Decode Logic 608: logic that decodes instructions from the LIC, requests the reads of appropriate registers from the frame within the FC that is associated with the thread, and forwards to the function units the commands needed to carry out the instruction; and Execution Pipeline (EP) 610: the function units that carry out the work of executing instructions for a thread.

In accordance with various embodiments, the actual microarchitecture of the EP in FIG. 6 is immaterial. It may range from a simple classical linear pipeline with no forwarding to a more complex superscalar design to which different instructions from different threads may be issued concurrently. However, it is assumed that instructions from different threads may be chosen on a near cycle-by-cycle basis, and interleaved within the EP.

The FC is illustrated as extending backwards to the AFP to reflect that the IP, and perhaps Thread Status Word of each frame in the FC, may be needed by this logic to decide which frames contain useful threads, and which one(s) should be chosen next for execution.

In accordance with various embodiments, instruction execution travels through FIG. 6 fairly conventionally from left to right with just a few notes. First, as will be discussed further herein, not just registers that are used as sources of operands need to be accessed, but also all registers that may be modified. This is to help ensure that a degree of logical correctness is maintained, i.e. operations that target a register are completed first before other modifications are scheduled.

Second, since registers are memory, the FC should be treated as a memory cache, and should intercept any memory operations targeted for those locations. Further, some of these operations may enter the FC while some instruction, that is also referencing these registers, is in execution. In such cases something must be done to ensure the instructions seem to be executed "atomically." This may be ensured by techniques varying from forwarding into the pipeline to flushing instructions within the pipeline that have not yet reached a retirement state.

Finally, it is possible for most instruction types to be executable in a very short execution pipeline, and only a certain subset, such as floating point or extended precision arithmetic operations, take longer periods of time. This is also uniquely solvable within an LIMA system, in accordance with various embodiments, by allowing such long duration operations to use the same pending reply mechanisms as used by load/stores.

Also illustrated in FIG. 6 are examples of traffic, in accordance with various embodiments, in and out of an LWP 104, as follows:

When there is room for an additional active thread frame in the FC, the AFP reads the appropriate Active List Registers to identify the next active frame to bring in, and has those values loaded into the FC;

When there is a miss in the LIC, a read request exits the LWP to fetch the appropriate line of code. The resulting data returns to the LIC;

When either a thread terminates or needs to be cast out to make room for others, its contents are shipped from the FC back to memory;

When externally generated memory reference requests may be accessing a part of the program visible memory space that holds thread frames, and those frames might reside in the FC, the requests go to the FCD to determine whether or not they actually refer to entries in the current FC contents. If so, the appropriate frame in the FC is accessed; and When instructions executed within the EP need to reference memory, the EP generates an appropriate memory request and launches it into the rest of the system. Responses resulting from the request return to the FCD, and if the target register is still in the FC, that entry is updated.

Figure 7:
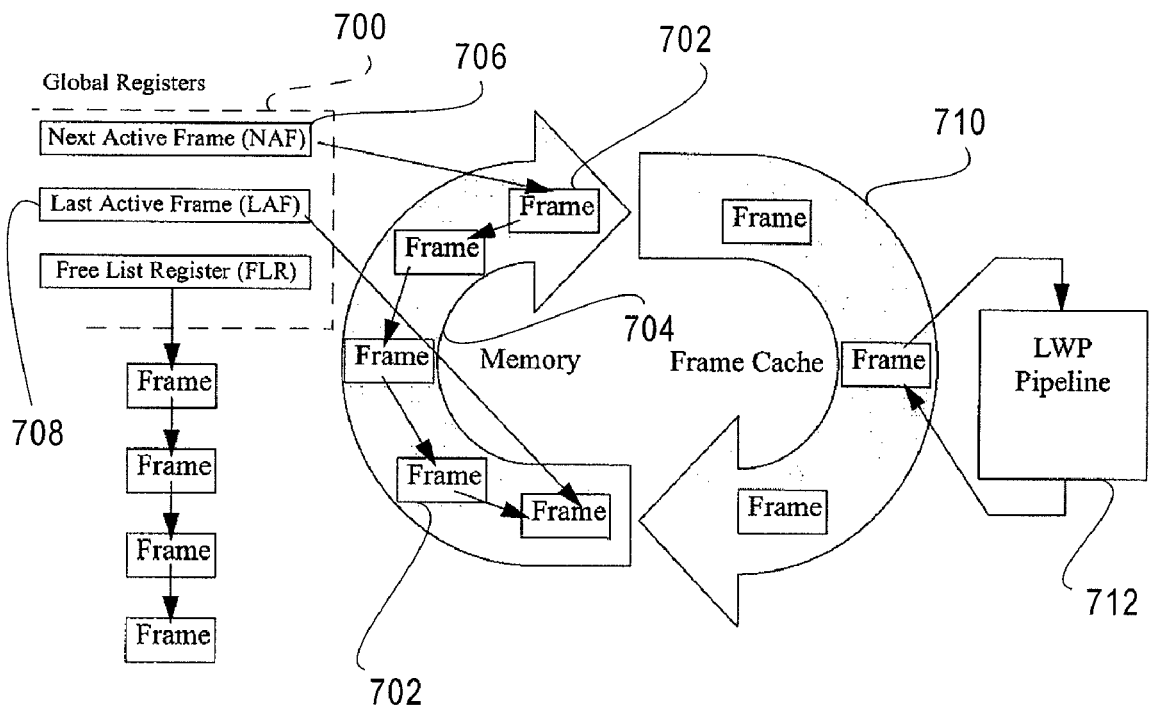
FIG. 7 schematically illustrates thread management, in accordance with various embodiments of the present invention.

FIG. 7 diagrams an exemplary method of managing the set of frames, both active and free, in accordance with various embodiments of the present invention. Some set of active list registers 700, visible to one or more LWPs as part of the LPC's global machine state, point to a list of active frames 702 in memory 704. Shown in FIG. 7 is a one way linked list of such frames, nominally using the FP register in each frame. The registers denoted in FIG. 7 as the Next Active Frame (NAF) 706 and Last Active Frame (LAP) 708 point into this structure. In accordance with various embodiments, other methods for linking the set of active frames in memory are also possible.

As these frames are selected by an LWP for execution, they are brought into the LWP's FC 710, from which some selection policy will select one of these active frames, and start its next instruction through the LWP's pipeline 712. Given the cost of moving a frame from memory to the FC, it is expected that in most cases, once a frame is resident in the FC, than at least several instructions in its behalf will be typically started.

In accordance with various embodiments, the order in which frames are selected from the FC is up to the scheduling policy implemented in the LWP's AFP logic, but after some period of time even frames that remain active are paged back into memory. In FIG. 7 this involves appending them to the back of the active list, but other options are possible.

Execution of an LWP instruction that causes a new thread to be created results in the accessing of the global FLR to determine the address of the next available frame. Whether the initializing data for the frame are written to memory directly, or whether a new entry in the FC is set up, and updates relayed there, is an implementation choice.

Figure 8:
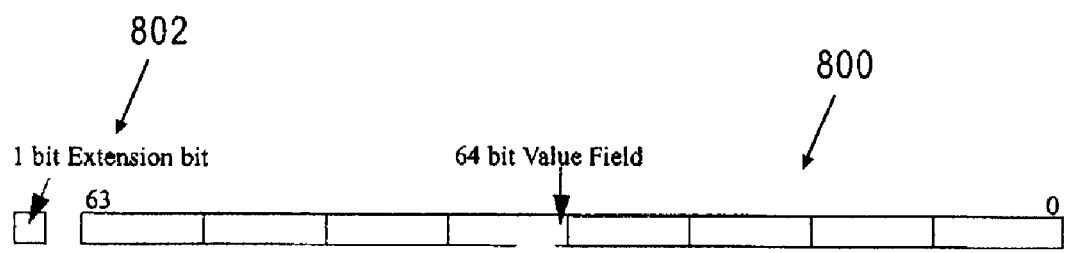
FIG. 8 schematically illustrates a memory word, in accordance with various embodiments of the present invention.

An exemplary embodiment of program visible memory as implemented in a LIMA architecture, in accordance with various embodiments of the present invention, consists of an array of individually addressable entities, referred to as extended double words or xdwords. For this embodiment it is assumed that each such xdword has two parts as shown in FIG. 8, a 64 bit value field 800 and a 1 bit extension bit 802. The 64 bit value field holds 8 bytes. In accordance with various embodiments, each of the 8 bytes share, and are controlled by, the same extension bit. Which byte is defined to be byte 0 and which is byte 7 depends on whether the architecture is big endian or little endian.

Those skilled in the art will understand that lengths other than 64 for the value field are equally possible.

For xdwords that contain instructions, it is assumed two instructions of 32 bits each are packaged per 64 bit data field. Again, which 32 bits is instruction 0 or 1 depends on the endian form of the architecture.

Figure 9:
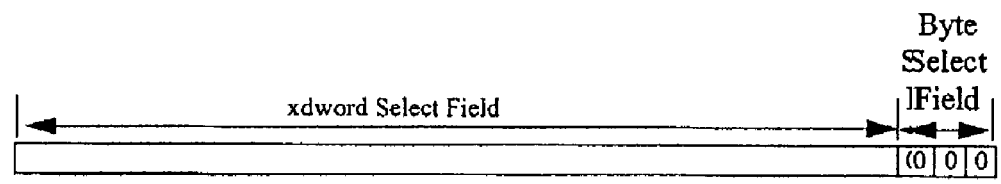
FIG. 9 schematically illustrates a data memory address to an aligned xdword, in accordance with various embodiments of the present invention.

It is also assumed that data addresses as generated by a program are also 64 bits, and address down to the byte level of the value field, as pictured in FIG. 9.

All xdwords that contain data are assumed byte aligned, that is the lower three byte address bits illustrated in FIG. 9 are zero. In accordance with various embodiments, only when such an address is formed, and an xdword memory operation performed, is the extension bit visible.

All xdwords that contain instructions are assumed 32 bit word aligned, that is the lower 2 bits of their address are zero.

Addresses formed by a program to address either instructions or data are generally referred to as virtual addresses. In accordance with various embodiments, these addresses are before any translation steps are applied to convert them to physical addresses that actually denote specific xdwords in physical memory. However, while physical addresses may be shorter in length than virtual addresses, it is assumed that they still address down to the byte, and require all three lower order bits to be zero before a complete xdword may be accessed, or both of the two lowest bits to be zero before an instruction may be fetched.

Figure 10:
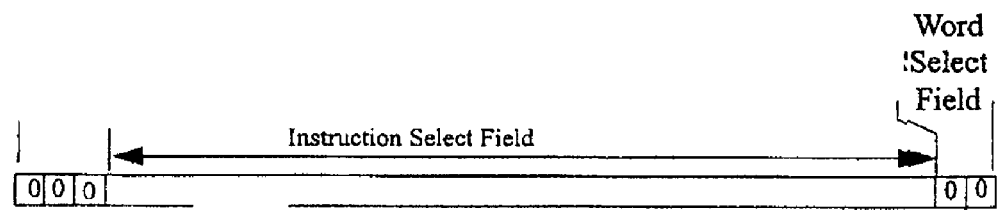
FIG. 10 schematically illustrates an instruction address, in accordance with various embodiments of the present invention.

In many systems, code is allowed to be placed only at the lower end of memory, and may not expand beyond some boundary. It is assumed here that code may take up no more than the bottom ⅛ of virtual memory, meaning that all IP addresses have their uppermost 3 bits, at least, set to zero (see FIG. 10).

The presence of an extension bit changes the way in which the contents of an xdword are interpreted on a memory reference. This bit should be checked regardless of the size of the data desired from the access: 8 bit byte, 32 bit instruction, 64 bit data.

In accordance with various embodiments of the present invention, if the extension bit of an xdword is set to "full," then the remaining 64 bits are treated as data, as in virtually all modern computers. The individual bits of the value field have no preconceived interpretation other than the one assumed by the program referencing the word.

However, when the extension bit of an xdword is set to "extended," then the value field takes on some specific hardware-defined meanings, as previously described herein. An exemplary, but not exclusive, method of encoding such different states efficiently, in accordance with various embodiments, is to use the lower two or three bits as an initial code, as illustrated in FIG. 11. This permits the inclusion in the upper bits of a complete normal xdword aligned address or a code address. In cases where additional encodings may be necessary, the upper few bits may also again be used, mainly because in such cases inclusion of a full address in the rest of the xdword is not necessary.

Note that some recodings, such as moving TOA to a Format 1, would free up additional codes for expansion of the state types. It is illustrated as is in FIG. 11 to allow for some extra bits for simple operand values for the trap procedure.

As known to those skilled in the art, a conventional memory system supports two kinds of requests for service from an executing program: reads and writes. A read accesses the memory, makes a copy of the requested bits, and returns them to the requesting processing logic. A write replaces certain bits in memory with bits provided by the processing logic. The memory does absolutely no interpretation of the bits being accessed, and the replies generated, such as with a read are very much simpler than the original request.

A LIMA architecture, in accordance with various embodiments of the present invention, is different. First, the presence of the extension bit means that the action to be taken on any incoming memory request is a function of both the request and the state of the xdword. Second, there is a richer suite of memory commands that may accompany a request, primarily to deal with additional functions that may be needed to support extended states. Third, all memory requests may be acknowledged, even on just successful completion of a store, so that the originating threads (which may be in logic halfway across the machine room) have a positive indication of successful completion of all operations. Finally, since all thread registers are synonymous with memory, these acknowledgement replies are themselves "memory operations," and should be treated as such.

FIG. 12 lists an exemplary set of memory operations that provides a rich capability to manipulate memory with extended states, in accordance with various embodiments of the present invention. FIG. 13 describes, in accordance with various embodiments, how the state of a memory location that is the target of one of these commands would change in response to operations of FIG. 12. FIG. 14 lists for each state and each command type, in accordance with various embodiments, the kind of value that would be returned to the requesting source. Finally, FIG. 15 lists some additional operations affecting thread execution that might be performed as a result of such commands, in accordance with various embodiments.

Several of the extended memory states, in accordance with various embodiments, are specifically designed for use with memory locations that are treated by a program as "memory" in the classical sense. Several others, however, are either partially or fully designed to be relevant to memory locations that are registers in a thread frame. The primary distinguishing feature is that registers are the targets of reply commands; conventional "memory" is not. The last column in FIG. 11 indicates which states fall in which category.

Besides responding to memory operations, however, in accordance with various embodiments, registers are also directly accessed by instructions executed by their owning thread from within some LWP. In such circumstances there are applicable functions and state transitions that are not the same as those related to changes to "memory" that result from load/store type references. FIG. 16 diagrams these changes, with the column labeled "current state," referring to the potential state of a memory location within the frame of an active thread. For FIG. 16, it is assumed that instruction execution is "atomic," that is the columns labeled "new state" refer to the state of memory locations/registers immediately after an instruction that referenced them as a register had completed, but before any memory operation initiated by that instruction had completed.

In a LIMA architecture, in accordance with various embodiments of the present invention, there are three different ways in which a register may be used: as the source of a value for an instruction (such as an operand for an add, or part of an address for a memory access); as the target of a computational instruction (e.g. to receive the result of an add); or as the target of a memory reference instruction. Those skilled in the art will also understand that combinations are also possible.

A register being referenced as a source in an instruction such as an add is expected to have a value that may be used in the addition process. If there is such a value (denoted by a Full state in the register), operation continues as it would have in any conventional architecture. However, in a LIMA, in accordance with various embodiments, there are at least three other classes of states that change this.

First are "values," but ones that are not compatible with the conventional meaning of an operand as a set of bits to be interpreted by the function being activated (e.g. a logical operation, versus an integer addition, versus a floating point operation). These include such states as Uninitialized or Error Code. In such cases, an exception for the instruction is set so that at retirement, exception masks in the Thread Status Word can determine whether the instruction should have been aborted, or execution continued. Further, if the latter, a choice could also be specified by the programmer to either propagate an error code into the output of the operation, or simply accept whatever set of bits emerge from the processing as a valid value.

Second are registers that do not currently hold a value, but for which there is some promise that a value is "on its way." The Empty and Pending Reply states are just such cases. These are unique to LIMA architectures, in accordance with various embodiments, and represent cases where a thread should wait until the values arrive, and then pick up execution. In the state transitions of FIG. 16, the state of the register is changed to either "Blocked Pending Data" (if it was initially empty), or "Blocked Pending Reply" (if it was waiting for completion of a load or store). In addition, in accordance with various embodiments, the LWP executing the thread takes the thread off the active list in a fashion that when it is restarted, it will restart at the beginning of the instruction where the blockage was discovered. As far as the thread is concerned, its computations are never affected by the delay in receiving the operand.

Finally are states that a register should not logically ever be in, such as being locked or having a forwarding pointer. This also includes a thread discovering that one of its registers is in a Locked state, something that should be impossible for a thread that is currently active. In such cases, an exception should be raised as described above. It would be expected that such exceptions are treated more seriously than others, perhaps resulting in a fault condition.

It should be noted that when a thread blocks, in accordance with various embodiments, its frame should be in a state such that when the thread is reawakened, it restarts the exact same instruction that caused it to delay earlier, and that no instruction in program order that occurred after it was to have been allowed to proceed to retirement.

A typical ALU instruction produces a value that is saved in a register for future use. In conventional architectures, the initial value of such a target register is irrelevant (except of course if it is also a source). In a LIMA architecture, in accordance with various embodiments, however, even a target register should be tested before the instruction is allowed to begin the computation phase, again because of the range of states the register can be in.

In the case of a register in either the Full state, or special values such as Uninitialized or Error code, the instruction should be allowed to proceed with replacement of the register's contents.

In the case of a promised value that hasn't arrived yet, even though the instruction will be over-writing the value, for logical safety one should suspend the instruction just as was done if it had been used as a source. This is to help prevent some outside event, such as a returning memory reference, from overwriting the newly computed value. By waiting for that value to return, it helps guarantee no such indeterminate behavior.

Finally, for the logically invalid states the action should be the same as for the source, raise an exception. Note, however, in this case if the exception is masked, the register's invalid state will be over-written with a correct value.

The kinds of systems envisioned for LIMA, in accordance with various embodiments of the present invention, are massively distributed shared memory architectures, where the latency to honor a memory request may be measured in hundreds to thousands of cycles. In such instances the lazy consistency model is implemented by allowing the original instruction that initiated the memory reference to complete or retire without regard for the completion of the operation. Instead, in the case of a load-like instruction, the target register is set to the special case "Pending Reply," and does not leave this state until the reply is received.

In addition, in order to ensure that a program knows when the memory write associated with a store instruction completes, the store instruction designates a register to receive a status reply about the success or failure of the store. During instruction execution, this register is set into a "Pending Reply" state.

Finally, depending on the microarchitecture of the LWP, it may be that there are long latency function units, such as extended precision floating point, where the ability to allow continuation of instruction execution is of value. In such cases, the target register again may be marked as "Pending" albeit in this case the information for what it is pending may reflect the function unit rather than memory.

For these configurations, the state transitions are in slightly different form than the previous cases in that in those cases where the target has a value that may be overwritten, it is set to the PR state before the instruction completes. All other state changes are the same as for an ALU target.

Clearly there are cases when the same register may be used both as a source and a target by the same instruction. In such cases, in accordance with various embodiments, the state changes of the target tend to supersede those of the source register.

Also, in accordance with various embodiments, it is not infrequent that one instruction will reference multiple registers. In such cases, if the results of testing any register results in an exception or a suspension of the instruction, then the instruction is so directed. Only if the testing of all registers signals "Continue," and there is no intervening external memory operation affecting the thread, should the instruction be allowed to continue to retirement.

Finally, there may often be specialized instructions that explicitly wish to test or change a register, regardless of that register's state (similar to the readx and writex memory operations of FIG. 12). Such instructions may have different state transitions than those of FIG. 13 through FIG. 15.

In accordance with various embodiments of the present invention, an exemplary ISA that includes the capabilities discussed earlier herein in terms of supporting many light weight threads is provided. The following description is not meant to be exhaustive; only attributes that are in some form not typical of conventional ISAs are described. This is particularly true of the individual instructions; only those that are unique to a LIMA design or are in some way affected by the other parts of the architecture, in accordance with various embodiments are described.

For various embodiments, the following general assumptions are made:

32 registers per thread frame, denoted $R0 through $R31;

Registers $R0 and $R1 form a thread status word, with fields as pictured in FIG. 17;

When referenced as a source operand $R0 always returns a value of zero, and $R1 always returns a value of 1. Neither register may be used as the target of a normal instruction;

Each register is a separate xdword, implying that an address of a register is an even multiple of 8 bytes (three low order zeros in a byte address);

Each thread frame starts on an even 32 xdword boundary, implying that the address of a frame itself is a multiple of 256 bytes (eight low order zeros in a byte address);

All instructions are 32 hits in length, aligned on an even 4 byte boundary;

Unless otherwise specified, all memory references are to aligned xdwords;

Any number of threads may be active at one time, limited only by the amount of memory available from which thread frames may be created; and Thread frame may be queued on one of several different lists, the active list, the free list, or one of several different trap lists. The Link Pointer in the TSW (FIG. 17) binds a frame into the appropriate list. Globally visible hardware registers provide the pointers to the head frames on each list.

Once declared active, a thread may execute instructions totally asynchronously from any other thread. What share of access a thread receives from an LWP depends on the number of other active threads, the thread's priority, and the LWP's scheduling policy. However, it is expected that most LWP implementations are starvation-free, that is, all active threads are guaranteed to eventually receive some time at some LWP, and thus guaranteed to make some forward progress on its executing program.

In accordance with various embodiments, new threads may be created synchronously by programs executing spawn and fork instructions, with the difference being where the new thread frame is allocated. For forks the new thread is allocated in the immediate vicinity (the same section) as the creating thread. For the spawn the creation point may be anywhere in the system as long as it is "near" some specified memory location.

New threads may also be created when a trap is taken, with the creation region the region where the exception was detected, and the trap raised.

Threads may be terminated only by their own execution of a trip instruction ("thread rest in peace"), at which the frame is automatically returned to a free list. Any clean-up needed before a frame is safe for reclamation is the responsibility of the software that ends with the trip.

In a related topic, it is noted that conventional computers often have programmer-invisible hardware timers on every memory reference that times-out if something goes wrong and the memory operation does not complete in a timely fashion. This is to prevent the CPU from locking up if a hardware problem occurs. The problem with this is that a separate timer is needed for each outstanding memory reference, something that clearly would be expensive in a LIMA system, in accordance with various embodiments, because they represent thread-specific global state. However, other work has defined a mechanism whereby multiple memory requests as found in a LIMA system, in accordance with various embodiments, may all be timed for error detection without requiring a separate timer for each operation. Such a mechanism is assumed to be part of the global state of a LIMA implementation, in accordance with various embodiments.

In accordance with various embodiments of the present invention, an exception is a report, typically from the hardware, that some condition has occurred, and results in some specific bit in the Exception field of the TSW (FIG. 17) being set. If at the beginning of an instruction all exception bits that are set have their matching mask bits also set, the instruction continues with execution in the normal way. If at the beginning of an instruction some exception bit is set, but its matching mask bit is not set, then the instruction is not issued and the thread traps.

This process, in accordance with various embodiments, involves:

marking the thread issuing the trap as suspended;
removing the thread from the active list; and
linking itself into the appropriate trap list.

A second source of traps, in accordance with various embodiments, may arise from the processing of memory operations that encounter some difficulty that cannot, or which the requesting thread has marked as should not, be handled by an error code back to the requestor. The entries marked as "EMS" in FIG. 15 represent such situations. When they occur, the actions are like a fork; a thread frame is taken from the free list, the parameters from the request stored as initial register values in the frame, the new frame's TSW set to some hardware specified values, and the frame is linked to the appropriate local trap list.

In either case, it is up to run-time software executed by run-time threads to process frames that have been linked onto these trap lists. This processing includes, when appropriate, modifying the thread's registers and/or restarting a thread.

Designing the hardware registers that form the heads of such lists to be memory-mapped and have extended memory semantics just like memory allows these daemon trap handler threads to block when such pointers are empty, and be awakened whenever the first such thread appends itself.

Arithmetic, logical, and control instructions for a LIMA ISA, in accordance with various embodiments, need look little different from conventional architectures, with three exceptions. First, the semantics of accessing registers changes a bit, both as source and target, as described previously herein.

Second, there will be times in a LIMA program where it is important to explicitly set the state of a register to something other than Full. The most common case might be to empty a register that will be used as a communication channel. This can be done in several ways, such as separate instructions that set, reset, or complement the extension bit independent of the value field of a register. One concern with such instructions is, however, the potential need for atomicity of change on both the extension bit and value fields. This could be done by memory operations onto a thread's own registers, but if opcode space is available, then some subset of the following instructions may also be appropriate:

empty t: wait for register to have a value of some sort and then set it to empty;

lock t, u: wait for register to have a value of some sort, then copy its value field to register u, and set t to locked;

fill t, u: register t may either have a value of some sort, or may be marked empty. Copy the value from register u to t, and set it to full;

fillx t, u: regardless of the current state of register t, force its value field to have a copy of register u, with the extension bit set to on;

force t, it, v: regardless of the current state of register t, force its value field to have a copy of register u, with the extension bit copied from some bit in register v; and readx: t, u, v: regardless of the state of register u, copy its extension bit into register t, and value field into register v, with both registers set to Full. This is the dual of force.

Finally, there may also be times when it is important to test the extended state of a register. Classical compare instructions with LIMA's normal register semantics will either suspend or raise an exception if they find the register(s) they wish to test to be in any state other than Full. Again there are two approaches, one of which is to use an instruction such as readx to access the register, and then test it as normal. This still raises the issue of atomicity—is the test instruction viewing the current state of the register? An alternative is to have instructions that ignore the current state of the register being tested before testing it, such as, for example,:

br_empty t, x: if the register t is currently empty then branch to the address specified by the x bits;

br_full t, x: if the register t is currently full then branch to x. This is not the same as br not empty;

br pending t, x: if the register t currently has a pending state, then branch;

br_error t, x: if the register t code, then branch;

br_x t, x: if the register t set, then branch to x; and br_ext t, u, v, x: if the register t currently has its extension bit set, and its value field, when masked with register u, equals v, then branch to x.

Those skilled in the art will understand that the dual of all of these branches, i.e. branch when the condition is not true, is also valuable.

Finally, one additional condition needs serious consideration for any LIMA implementation, in accordance with various embodiments of the present invention. As discussed earlier, memory operations can go on out of program order, and if there is concern by the compiler or programmer about the potential for memory hazards, then explicit stalls need to be in place as separate instructions in the program. At the simplest, such stall may be implemented by performing some dummy operation against the status register from a prior memory instruction before starting the next one. This serializes the memory operations.

While this helps assure logical correctness, it does mean that there will be opportunities for concurrency that are not taken. To reclaim much of these opportunities simply, one may include in the ISA a stall_on_address match (STAM) instruction. This instruction specifies two registers, t and u. Register t is the target register for whatever prior memory operation needs to be checked, and register u contains the address of the memory reference that is about to be launched by the next instruction. The implementation of STAM tests the state of register t, and if it is anything other than pending, the thread's execution continues with the next instruction. If the register t is still in the pending state, and the definition of the state includes at least some of the virtual address of the original memory reference, then a comparison is made between those bits and the equivalent bits in the other register u. If there is a mismatch, one knows the addresses of the two references are different, and execution may continue even without the reply from the first reference. If there is a match, then it appears that there may be a memory hazard, and the STAM changes the state of register t from PR to BPR, and the thread will block. A return of the reply will restart the thread at the STAM, and execution will continue.

Standard loads and stores in a LIMA architecture, in accordance with various embodiments, look like those of conventional ISAs in that they specify an addressing mode (base plus displacement, base plus index, . . . ), a source or target register, size of access, and how to treat less than xdword accesses (sign extend, zero fill, . . . ). However, in LIMA, in accordance with various embodiments, there are several modifications:

Source and target registers obey the register semantics as previously described herein;

On stores, a register to receive the status reply must be specified. This can be either the same as the source register, or a separate register; and On accesses to locations that are currently in a state other than full, the semantics of when replies are sent, and what is sent with the replies, is a function of the state of the target location, as shown in FIG. 12 through FIG. 14, assuming the read command was sent by a load, and the write command was sent by a store.

Besides conventional loads and stores, a LIMA architecture, in accordance with various embodiments, also includes loads and stores that explicitly recognize the additional states that memory may take on. These include:

load_e: load and empty. When the memory operation sent by this instruction finds a full location, it returns a copy as with a normal load, but also atomically sets the memory state to empty. In FIG. 14 through FIG. 16 this is implemented with the read & empty command;

loadx_lock: similar to load empty except that it leaves the target memory location locked. Using the read & lock command, of FIG. 12, this will return a copy of the value field with at least one of the bits replaced by a copy of the extension bits. The value bits that are returned include at least the bits that are changed by the lock state value;

loadx: reads the contents of the target's value field regardless of the target's state, using the read & lock command;

Using this after a loadx lock allows the state of the entire original xdword to be reconstructed, both value and extension bit; and store_e: store at empty. The intent of this instruction is to provide the dual to load e, namely a write that completes only when the location is empty. In accordance with various embodiments, there are at least two options as to what happens when the target is not empty at the time the memory command arrives at the target. First, an error code may be returned; alternatively, a trap may be taken at the memory, and a new thread at the target may watch for the location to go empty, as described in FIG. 15. The choice of which option to employ may be specified either by separate opcodes or by a flag in the TSW that goes along with the memory command (the EMS bit in FIG. 17);

store all full: stores a value into the target memory location, regardless of the target memory's initial state, and leaves the target's extension bit to full. This invokes the writex command of FIG. 12; and store_all other: just as in store all full but instead of setting the extension bit to full, it set the extension to extended, allowing an arbitrary state value to be over-written into a memory location.

Atomic memory operations (AMO), in accordance with various embodiments, perform a read-compute-write operation against a memory location in such a way that from the time that the read is performed, no other normal memory operation is allowed to touch the location until the write back of the computed result is complete.

Instruction sequences built from a series of loadx lock, loadx, and storex achieve such atomicity by locking the target after reading it, performing the computations on that value in a thread's registers, and then unlocking the memory location only when the final value is ready.

While logically correct, this has the drawback of a potentially very long and unpredictable period of time during which the location is unavailable. A single instruction AMO would be a combination of a read and a write, with one register to serve as the source of the data to be used in the combination (as in a store), and another serves to hold the reply from a read of the location (as in a load). The memory operation AMO in FIG. 12 would be launched by the execution of the AMO, contain the value to be combined with the target, the operation to be performed, and the address of the register to hold the return value. When the AMO arrives, it reads the xdword value from the location and returns it to the target register, combines it with the xdword from the instruction, and replaces the combination into the target memory location. A sample AMO instruction would be, in accordance with various embodiments:

int_fetch add t u v immediate, where t, u, and v are registers. The value of register u plus the immediate forms the address of the target location. Register t receives a copy of this location, and register v provides a value to be added into the memory.

Several variations of this are possible, in accordance with various embodiments:

Other operations could be specified either by other opcodes or values in a fourth register, such as swap, compare and swap, and, or, subtract, and even floating point add, if such functional units are available near the memory;

In some cases, the original value is not of concern, so a variation such as an int mem add would use t as a status reply register as in a store, rather than a value receiver as in a load;

An "x" variation of this may return the entire original state of the target memory location, and replace the entire contents of the memory, extension included, from the instruction-provided data. An atomic exchange instruction that swaps the entire state of the memory location with the state of a register is particularly useful. A memory operation termed amox is defined in FIG. 12 to provide this capability; and In many cases, such instructions may wish to treat states other than full as valid states for the AMO to interact with. This is particularly true of the empty state, since semantically a store is capable of filling an empty location. In these cases, assuming that the target memory's value is zero allows the combination to occur without incident. The semantics of the AMO memory operation in FIG. 12 exhibits this. As discussed later, such a capability, in conjunction with an AMO "or" or "add," is particularly useful for multiple signalers.

It should be noted that such AMOs may be implemented very inexpensively, and in a very light weight thread compatible manner, by encapsulating short "at the memory" sequences into a memory operation, and executing them at the same memory hardware that tracks memory state transitions.

Several other instructions are particularly useful in a LIMA context, in accordance with various embodiments:

geffp t u: register u contains a register number in the current frame. Register t is loaded with the virtual address of that register. A value of zero in u thus returns the address of the base of the current thread's frame in memory; and block_copy t u v w: Copy a number of xdwords specified by the contents of register w starting from the address specified by the contents of register v to the address specified by register u, and return a status into register t. No memory states at either the source or receiving end are checked.

In accordance with various embodiments, these instructions may also be used for initializing multiple registers in either a thread's own frame or some child's frame.

In accordance with various embodiments, instructions that manipulate the state of threads and thread frames include, for example:

activate t u: make the frame located at the address specified by register t active and eligible to issue instructions. The address specified by t is rounded to the owning frame address. Since this involves modifications to the TSW in the target frame as in an AMO, a register is included to collect status;

break t: use the bits in register t to raise an exception in the current thread;

evict: The current frame is to cease execution of instructions, be purged from the frame cache, and be placed on the end of the active list. This does not change the state of the thread or prevent it from being reloaded into an LWP for continued execution;

fork t u: A free frame is requested in the same section as the current frame is in, and some subset (perhaps all) of registers in the new frame are copied from the current frame, except that the contents of register u are used as the IP for the new frame. After copying all data the new frame is made active and eligible for execution. When the fork issues, in accordance with various embodiments, register t is placed in the PR state.

If an error occurs during the initialization, an error code is returned to it. If the fork is successful, an "OK" value (typically all zeros in a full state) is placed in it, much as with a store. As with a store, the update of the status register t occurs asynchronously with the retirement of the fork instruction;

frame_cache_flush: similar to evict but all frames in this LWP's frame cache are evicted and placed at the end of the active list;

spawn t u v: similar to fork except that a register v provides a virtual address that identifies the section where the new thread should be created. Optionally, to conserve bandwidth, less than the full set of registers may be copied from the parent to the child frame, such as only registers 0 through 7;

suspend t u: Change the state of the thread frame pointed to by u to be suspended. The t register serves as a response register, and is loaded with a copy of the frame's protect bit. This load occurs asynchronously with the retirement of the suspend; and trip: ("thread rest in peace") The current thread ceases execution, and enters the free state. The frame is requeued onto the free list. No hardware verification of the completion of any outstanding memory references is performed.

Thus, the present invention provides techniques for computer architectures that provide lightweight multi-threaded architectures. The techniques enable increased performance in any computing system, but especially in a massively parallel system, by a combination of increasing support for concurrency and reducing both the number and latency of potentially long-latency events.

The increase in concurrency is achieved in several areas: increasing significantly the maximum number of threads, and threads per core, that a program may take advantage of, and to do so in a scalable fashion that does not rely on adding additional CPUs or growing the size of hardware register files; and simplifying the hardware needed to support long latency events such as remote memory references in such a way that it increases the number of such concurrent memory references that each thread may have active at any time; eliminating the need for programs about keeping each thread active; and providing mechanisms that allow individual threads to communication with each other, and block and unblock with little or no explicit program cost.

Likewise, decreasing latencies as seen by an overall program may be achieved in several ways: permitting the simplification of the design of multithreaded cores to the point where they can, as technology permits, be placed in large numbers nearer memory than current practice, up to and including the same die as enabled by multi-core and PIM semiconductor technology; reducing the cost of allocating (or re-allocating) a set of hardware resources to a new thread to the point where it need not be handled by time-consuming software; reducing the essential state associated with a thread to the point where it is possible to give a thread locality awareness, that is the ability to determine "where they are" in terms of memory locality, the ability to actively specify some memory region that better fits their program's needs in terms of such locality, and then the ability to "move" the computation associated by the thread to that region; and reducing significantly the cost of communicating between threads when necessary to implement key latency-intensive global parallel program constructs such as synchronizations, barriers, and collective operations.

Interestingly, one of the few new programming metaphors that has had measurably good effects on the productivity of programming, object oriented programming (and its variants that show up in programming languages such as Smalltalk, C++, Java, . . . ), has attributes that fit well in hand with such guiding principles. When an object is to be referenced or manipulated in some way, some small number of parameters (of approximately the total size of a typical cache line) are often encapsulated and given to some piece of procedure code that is tailored to that object type, and is designed to access the inner components of the object.

When an architecture has some of the above new properties, executing such a method involves launching a new thread to execute "near" the object, with the initial thread state holding the desired parameters. Executing this thread in some nearby execution site allows all references to the object to occur in a low latency environment.

With proper dataflow-like protocols to allow the returning values to be accepted, the code launching the thread can very well be non-blocking, allowing other such independent threads to be launched to other objects.

The result may be three-fold. First, what was potentially a significant series of long-distance high latency cache misses to access the object's components is now a single two-way transfer. Second, the time during which the object is under modification is shortened drastically because of the closeness of the processor to the memory (this also reduces the time when the object is a point of possible contention, and eliminates the need for complex long-distance memory lock-out protocols), and finally making the original call non-blocking (that is the thread that makes the call need not come to a halt until the thread performing the method completes the method) allows other such long-distance activities to be launched concurrently by the calling thread.

In some applications such as pointer chasing, this gets even better, since as the thread moves from object to object there is exactly one long-distance transfer per pointer link followed.

Although certain embodiments have been illustrated and described herein for purposes of description of the preferred embodiment, it will be appreciated by those of ordinary skill in the art that a wide variety of alternate and/or equivalent embodiments or implementations calculated to achieve the same purposes may be substituted for the embodiments shown and described without departing from the scope of the present invention. Those with skill in the art will readily appreciate that embodiments in accordance with the present invention may be implemented in a very wide variety of ways. This application is intended to cover any adaptations or variations of the embodiments discussed herein. Therefore, it is manifestly intended that embodiments in accordance with the present invention be limited only by the claims and the equivalents thereof.

What is claimed is:

1. A method comprising:

processing, by one of a memory controller or a memory interface within a lightweight multi-threaded architecture (LIMA) computing system, a request to access a memory location by a program thread being executed by a processor within the LIMA computing system;

evaluating, by the one of a memory controller or a memory interface, an extension field of the memory location to determine a state of a value field of the memory location; and accessing, by the program thread, the value field based upon said evaluating an extension field.

2. The method of claim 1, wherein the extension field has at least two possible settings, the at least two settings including full and extended.

3. The method of claim 2, further comprising:

interpreting data, by the one of a memory controller or a memory interface, as a series of information bits to be interpreted by some program that accesses the value field when the extension field is set at full; and interpreting information, by the one of a memory controller or a memory interface, in the value field and/or extension field, by the memory interface, to control how any memory request that accesses the memory location is to be performed when the extension field is set at extended.

4. The method of claim 3, wherein states in which a memory location may be when the extension field is set at extended includes at least one from a group comprising:

an indication that the memory has not been initialized;

an indication that it contains an error code;

an indication that the location is locked from some type of access;

an indication that the memory location is logically empty;

an indication that the memory location is not only logically empty, but that it is a register in some thread frame, and a next instruction for a program associated with that thread requires a value from the register before the instruction may complete and the thread's execution may continue;

an indication that the memory location is not only logically empty and that some instruction for a program for a thread has designated this register to receive the result or status from some prior memory request, but that no other instruction from that program has as yet needed the result or status;

an indication that the location is actually a register in some thread frame, that some instruction for a program for that thread has designated this register to receive the result or status from some prior memory request, and that the next instruction for that program requires completion of that memory operation before the instruction may complete and the thread's execution may continue;

the address of some other location to which any request to this location should be forwarded, including options on what to leave behind in this location after the forwarding has occurred; and information that may be used to start a new thread within an LPC controlling the memory location whenever any sort of memory request attempts to access the location.

5. The method of claim 4, wherein a suite of memory operations that may be generated by a program includes at least one from a group comprising:

reads and writes that may be blocked, forwarded, or responded to with an error code, depending on an extended state;

extended reads that allow complete access to the location without state interpretation;

extended writes that override the state of a target location and allow complete access to the target location without state interpretation;

options on reads that will convert the state of a location to empty after an access;

options on reads that will convert the state of a location to locked after an access;

options on writes that change the contents of the target memory location only if the initial state was empty;

atomic memory operations that perform a read-compute-write against a target memory location without allowing any other access to that location to occur during the sequence; and writes that expect to be targeting a memory location that is also a register in some frame, and that will awaken the thread associated with that frame if it is currently stalled on that register.

6. A method comprising:

executing, by a lightweight processor (LWP) of a lightweight multi-threaded architecture (LIMA) computing system, at least one program thread, wherein the LWP includes a pool of information defining one or more separate program threads, each of which has associated with it a frame comprising one or more unique registers that a thread's program may manipulate;

deciding, by the LWP, which thread to allow to execute an instruction from that thread's program; and also deciding, by the LWP, when it is appropriate to evict a frame and/or bring in a new frame corresponding to a different thread than any currently executing.

7. The method of claim 6, further comprising:

decoding, by the LWP, instructions from a chosen frame;

determining, by the LWP, which registers from the thread's frame are to be accessed; and determining, by the LWP, if the states of those registers is acceptable for the instruction to continue.

8. The method of claim 6, wherein instructions that perform a long latency operation may optionally elect to not wait for the operation to finish before changing state of a target register to logically empty and changing a target for the long latency operation.

9. The method of claim 8, wherein an instruction to perform a memory operation may elect to leave the instruction's target register in a logically empty state and include, within the target register, at least some of the memory address from which desired data or status is to be received.

10. The method of claim 9, wherein an instruction may compare contents of a register to a memory address in order to determine whether or not a memory operation reflected by the register has been completed and if the memory operation has not been completed, the address for the memory operation as recorded in the register is the same as the address from the instruction.

11. A computing system comprising:

one or more nodes, each node comprising at least one lightweight processing chip (LPC) that includes a lightweight processor (LWP) core and at least one memory module, each node being adapted to concurrently execute a number of independent program threads on behalf of one or more application programs, and each thread being adapted to generate one or more requests to access memory anywhere in the computing system;

an interconnect network communicatively coupling multiple nodes such that LPCs within a node may issue a memory or thread creation request that may be routed to a node that includes designated memory locations and return one of a copy of the data or completion status back to a requesting LPC;

an internal node routing system adapted to facilitate memory requests between LPCs within a node and to facilitate communication with the interconnect network for memory requests elsewhere within the computing system; and memory within the computing system that is external to the nodes;

wherein each LPC is adapted to receive memory requests and are adapted to generate memory requests.

12. The computing system of claim 11, further comprising at least one heavyweight processor (HWP) communicatively coupled to the interconnect network and adapted to generate streams of memory reference requests.

13. The computing system of claim 12, wherein the at least one HWP does not include program visible memory.

14. The computing system of claim 13, further comprising at least one cache and/or machine register.

15. The computing system of claim 11, wherein the computing system is a massively parallel computing system.

16. The computing system of claim 11, wherein at least some of the LPCs include multiple memory modules.

17. The computing system of claim 16, wherein at least some of the LPCs include multiple LWPs.

18. The computing system of claim 17, wherein each LWP is adapted to execute programs and generate memory requests.

19. The computing system of claim 18, wherein each LPC includes an interconnection network that allows memory requests from each LWP to reach the memory modules, caches within the LWPs, and ports to the node interconnect network.

20. The computing system of claim 11, wherein each memory module comprises memory locations and each memory location has associated with it a value field and an extension field.

21. The computing system of claim 20, wherein the extension field has at least two possible settings:
    full, which indicates that the value field contains data to be interpreted as a series of information bits to be interpreted by some program that accesses the value field; and
    extended semantics, which indicates that the value field has information that is to be interpreted by the memory interface to control how any memory request that accesses the location is to be performed.

22. The computing system of claim 21, wherein states in which a memory location may be when the extension field is set includes at least one from a group comprising:
    an indication that the memory has not been initialized;
    an indication that it contains an error code;
    an indication that the location is locked from some type of access;
    an indication that the memory location is logically empty;
    an indication that the memory location is not only logically empty, but that the memory location is a register in some thread frame, and a next instruction for a program associated with that thread requires a value from the register before the next instruction may continue;
    an indication that the location is actually a register in some thread frame, that some instruction for a program for that thread has designated this register to receive the result or status from some prior memory request, and that the next instruction for that program requires completion of that memory operation before the next instruction may continue;
    the address of some other location to which any request to this location should be forwarded, including options on what to leave behind in this location after the forwarding has occurred; and
    information that may be used to start a new thread within an LPC controlling the memory location whenever any sort of memory request attempts to access the location.

23. The computing system of claim 22, wherein a suite of memory operations that may be generated by a program includes at least one from a group comprising:
    reads and writes that may be blocked, forwarded, or responded to with an error code, depending on an extended state;
    extended reads that allow complete access to the location without state interpretation;
    extended writes that override the state of a target location and allow complete access to the location without state interpretation;
    options on reads that will convert the state of a location to empty after an access;
    options on reads that will convert the state of a location to locked after an access;
    options on writes that change the contents of the target memory location only if an initial state was empty;
    atomic memory operations that perform a read-compute-write against a target memory location without allowing any other access to that location to occur during a sequence; and
    writes that expect to be targeting a memory location that is also a register in some frame, and that will awaken the thread associated with that frame if it is currently stalled on that register.

24. The computing system of claim 23, wherein an instruction set for an LWP includes at least one from a group comprising:
    generate specialized memory requests;
    explicitly set the state of one of the LWP's corresponding registers without regard to the register's current state;
    test the state of one of the LWP's corresponding registers without blocking;
    designate that a memory frame at some address is now to be considered active;
    evict itself from the current pool of threads from the current LWP;
    evict all current frames from the current LWP;
    terminate a thread's own existence as an active thread;
    place some other thread in a suspended state; and
    test an address associated with a pending memory request as recorded in a register to see if that address potentially matches some other address.

25. The computing system of claim 18, wherein at least one LWP includes a pool of information defining one or more separate program threads, each of which has associated with it a frame comprising one or more unique registers, that a program may manipulate.

26. The computing system of claim 25, wherein at least one LWP includes logic adapted to decide which thread is to be allowed to execute an instruction from that thread's program, and also decide when it is appropriate to evict a frame and/or bring in a new frame corresponding to a different thread than any currently executing.

27. The computing system of claim 18, wherein at least one LWP comprises an optional instruction cache to hold blocks of program text for the threads.

28. The computing system of claim 25, wherein at least one LWP comprises logic adapted to decode instructions from a chosen frame, determine which registers from the thread's frame are to be accessed, and determine if the states of those registers is acceptable for the instruction to continue.

29. The computing system of claim 25, wherein at least one LWP includes a frame cache that contains one or more frames in support of one or more threads that may be accessed either to support an instruction being executed by some instruction for an owning thread, or receive response messages from previously issued memory requests.

30. The computing system of claim 29, wherein at least one LWP includes logic adapted to access registers for a particular instruction, either from the frame cache or memory, and test their contents before further processing.

31. The computing system of claim 25, wherein at least one LWP includes an execution pipeline capable of executing one or more instructions, from the same or different threads, generating memory requests as called for, testing for exceptions, and writing back results when available to the appropriate register in an appropriate frame.

32. The computing system of claim 25, wherein each frame of registers is contained in a sequential block of known length that has a unique address in memory.

33. The computing system of claim 29, wherein memory operations from any thread that target any register will be routed to either the frame cache holding the most recent copy of the frame, or to memory if the frame is not currently in a frame cache.

34. The computing system of claim 24, wherein multiple memory operations may be issued and/or execute concurrently and extended semantics within a register associated with each memory operation being issued and/or executed are provided to indicate status of the memory operation being issued and/or executed.

35. The computing system of claim 34, wherein memory hazards may be avoided among multiple memory operations based upon status of an operation.

36. The computing system of claim 22, wherein memory locations may be in one of a plurality of the states.

37. A computing system comprising:
one or more nodes, each node comprising at least one lightweight processing chip (LPC) that includes a lightweight processor (LWP) core and at least one memory module, each node being adapted to concurrently execute a number of independent program threads on behalf of one or more application programs, and each thread being adapted to generate one or more requests to access memory anywhere in the computing system;
an interconnect network communicatively coupling multiple nodes such that LPCs within a node may issue a memory or thread creation request that may be routed to a node that includes designated memory locations and return one of a copy of the data or completion status back to a requesting LPC; and
at least one heavyweight processor (HWP) communicatively coupled to the interconnect network and adapted to generate streams of memory reference requests;
wherein the at least one HWP does not include program visible memory.

38. The computing system of claim 37, further comprising at least one cache and/or machine register.

39. A massively parallel computing system comprising:
one or more nodes, each node comprising at least one lightweight processing chip (LPC) that includes a lightweight processor (LWP) core and at least one memory module, each node being adapted to concurrently execute a number of independent program threads on behalf of one or more application programs, and each thread being adapted to generate one or more requests to access memory anywhere in the computing system; and
an interconnect network communicatively coupling multiple nodes such that LPCs within a node may issue a memory or thread creation request that may be routed to a node that includes designated memory locations and return one of a copy of the data or completion status back to a requesting LPC.

40. A computing system comprising:
one or more nodes, each node comprising at least one lightweight processing chip (LPC) that includes a lightweight processor (LWP) core and at least one memory module, each node being adapted to concurrently execute a number of independent program threads on behalf of one or more application programs, and each thread being adapted to generate one or more requests to access memory anywhere in the computing system; and
an interconnect network communicatively coupling multiple nodes such that LPCs within a node may issue a memory or thread creation request that may be routed to a node that includes designated memory locations and return one of a copy of the data or completion status back to a requesting LPC;
wherein at least some of the LPCs include multiple memory modules; and
wherein at least some of the LPCs include multiple LWPs.

41. The computing system of claim 40, wherein each LWP is adapted to execute programs and generate memory requests.

42. The computing system of claim 41, wherein at least one LWP includes a pool of information defining one or more separate program threads, each of which has associated with it a frame comprising one or more unique registers, that a program may manipulate.

43. The computing system of claim 42, wherein at least one LWP includes logic adapted to decide which thread is to be allowed to execute an instruction from that thread's program, and also decide when it is appropriate to evict a frame and/or bring in a new frame corresponding to a different thread than any currently executing.

44. The computing system of claim 41, wherein at least one LWP comprises an optional instruction cache to hold blocks of program text for the threads.

45. The computing system of claim 42, wherein at least one LWP comprises logic adapted to decode instructions from a chosen frame, and determine which registers from the thread's frame are to be accessed.

46. The computing system of claim 42, wherein at least one LWP includes a frame cache that contains one or more frames in support of one or more threads that may be accessed either to support an instruction being executed by some instruction for an owning thread, or receive response messages from previously issued memory requests.

47. The computing system of claim 46, wherein at least one LWP includes logic adapted to access registers for a particular instruction, either from the frame cache or memory, and test the registers's contents before further processing.

48. The computing system of claim 42, wherein at least one LWP includes an execution pipeline capable of executing one or more instructions, from the same or different threads, generating memory requests as called for, testing for exceptions, and writing back results when available to the appropriate register in an appropriate frame.

49. The computing system of claim 42, wherein each frame of registers is contained in a sequential block of known length that has a unique address in memory.

50. The computing system of claim 46, wherein memory operations from any thread that target any register will be routed to either the frame cache holding the most recent copy of the frame, or to memory if the frame is not currently in a frame cache.

51. The computing system of claim 40, further comprising at least one heavyweight processor (HWP) communicatively coupled to the interconnect network and adapted to generate streams of memory reference requests.

52. The computing system of claim 51, wherein the at least one HWP does not include program visible memory.

53. The computing system of claim 52, further comprising at least one cache and/or machine register.

54. The computing system of claim 40, wherein the computing system is a massively parallel computing system.

55. The computing system of claim 40, wherein at least some of the LPCs include multiple memory modules.

56. The computing system of claim 55, wherein at least some of the LPCs include multiple LWPs.

57. The computing system of claim 56, wherein each LWP is adapted to execute programs and generate memory requests.

58. The computing system of claim 57, wherein each LPC includes an interconnection network that allows memory requests from each LWP to reach the memory modules, caches within the LWPs, and ports to the node interconnect network.

59. The computing system of claim 40, wherein each memory module comprises memory locations and each memory location has associated with it a value field and an extension field.

60. The computing system of claim 59, wherein the extension field has at least two possible settings:
full, which indicates that the value field contains data to be interpreted as a series of information bits to be interpreted by some program that accesses the value field; and
extended semantics, which indicates that the value field has information that is to be interpreted by the memory interface to control how any memory request that accesses the location is to be performed.

61. The computing system of claim 60, wherein states that a memory location may be in when the extension field is set includes at least one from a group comprising:
an indication that the memory has not been initialized;
an indication that it contains an error code;
an indication that the location is locked from some type of access;
an indication that the memory location is logically empty;
an indication that the memory location is not only logically empty, but that the memory location is a register in some thread frame, and a next instruction for a program associated with that thread requires a value from the register before the next instruction may continue;
an indication that the location is actually a register in some thread frame, that some instruction for a program for that thread has designated this register to receive the result or status from some prior memory request, and that the next instruction for that program requires completion of that memory operation before the next instruction may continue;
the address of some other location to which any request to this location should be forwarded, including options on what to leave behind in this location after the forwarding has occurred; and
information that may be used to start a new thread within an LPC controlling the memory location whenever any sort of memory request attempts to access the location.

62. The computing system of claim 61, wherein a suite of memory operations that may be generated by a program includes at least one from a group comprising:
reads and writes that may be blocked, forwarded, or responded to with an error code, depending on an extended state;
extended reads and writes that override the state of a target location and allow complete access to the location without state interpretation;
options on reads that will convert the state of a location to empty after an access;
options on reads that will convert the state of a location to locked after an access;
options on writes that change the contents of the target memory location only if the initial state was empty;
atomic memory operations that perform a read-compute-write against a target memory location without allowing any other access to that location to occur during the sequence; and
writes that expect to be targeting a memory location that is also a register in some frame, and that will awaken the thread associated with that frame if the thread is currently stalled on that register.

63. The computing system of claim 62, wherein an instruction set for an LWP includes at least one from a group comprising:
generate specialized memory requests;
explicitly set the state of one of the LWP's corresponding registers without regard to the register's current state;
test the state of one of the LWP's corresponding registers without blocking;
designate that a memory frame at some address is now to be considered active;
evict itself from the current pool of threads from the current LWP;
evict all current frames from the current LWP;
terminate a thread's own existence as an active thread;
place some other thread in a suspended state; and
test an address associated with a pending memory request as recorded in a register to see if that address potentially matches some other address.

64. The computing system of claim 63, wherein multiple memory operations may be issued concurrently and extended semantics within a register are provided to indicate status of an operation.

65. The computing system of claim 64, wherein memory hazards may be avoided among multiple memory operations based upon status of an operation.

66. The computing system of claim 61, wherein memory locations may be in one of a plurality of the states.

* * * * *